US012123234B1

(12) United States Patent
Colligan

(10) Patent No.: US 12,123,234 B1
(45) Date of Patent: Oct. 22, 2024

(54) SLIDING DOOR WITH EMERGENCY SWING FEATURE

(71) Applicant: Accurate Lock & Hardware Co. LLC, Stamford, CT (US)

(72) Inventor: Francis Colligan, New Haven, CT (US)

(73) Assignee: Accurate Lock & Hardware Co. LLC, Stamford, CT (US)

( * ) Notice: Subject to any disclaimer, the term of this patent is extended or adjusted under 35 U.S.C. 154(b) by 0 days.

(21) Appl. No.: 18/203,730

(22) Filed: May 31, 2023

(51) Int. Cl.
*E05D 15/06* (2006.01)
*E05C 1/06* (2006.01)
*E05C 3/04* (2006.01)
*E05C 19/00* (2006.01)

(52) U.S. Cl.
CPC ............ *E05D 15/0604* (2013.01); *E05C 1/06* (2013.01); *E05C 3/041* (2013.01); *E05C 19/005* (2013.01); *E05D 15/0626* (2013.01); *E05Y 2800/102* (2013.01); *E05Y 2800/252* (2013.01); *E05Y 2900/132* (2013.01)

(58) Field of Classification Search
CPC .............. E05D 15/0626; E05D 15/063; E05D 15/0604; E06B 3/5072; E06B 3/26; E06B 7/32; E05C 1/06; E05C 3/041; E05C 19/005; E05Y 2800/746; E05Y 2800/25
See application file for complete search history.

(56) References Cited

U.S. PATENT DOCUMENTS

| | | | | | |
|---|---|---|---|---|---|
| 2,801,688 | A * | 8/1957 | Singleton | E06B 3/2605 | 49/168 |
| 3,300,897 | A * | 1/1967 | Wikkerink | E06B 3/5072 | 49/141 |
| 3,354,581 | A * | 11/1967 | Kessner | E06B 3/50 | 49/327 |
| 3,834,081 | A * | 9/1974 | Catlett | E05F 15/643 | 49/327 |
| 4,438,594 | A * | 3/1984 | Bunzl | E06B 3/50 | 49/411 |
| 4,760,872 | A * | 8/1988 | Hale, Jr. | E06B 7/32 | 160/90 |
| 5,406,748 | A * | 4/1995 | Davlantes | E06B 7/32 | 49/245 |

(Continued)

FOREIGN PATENT DOCUMENTS

WO WO2018107051 A1 6/2018

*Primary Examiner* — Justin B Rephann
(74) *Attorney, Agent, or Firm* — FORGE IP, PLLC

(57) ABSTRACT

A horizontally elongated rail is adapted to be mounted with respect to a door opening, and a door assembly is slideably mounted on the rail and is slideable along a generally vertical imaginary plane. The door assembly includes an upper section cooperating with the rail to provide for the slideable mounting of the door assembly on the rail, and a lower section pivotably attached to the upper section at an attached end thereof so as to be pivotable with respect to the upper section about a generally vertical axis from a closed position, in which the upper section and the lower section are generally co-planar, to an open position. A safety release has an engaged position, in which the lower section and the upper section are fixed in the closed position, and a disengaged position, in which the lower section is pivotable to the open position.

26 Claims, 16 Drawing Sheets

(56) References Cited

U.S. PATENT DOCUMENTS

| | | | | |
|---|---|---|---|---|
| 6,618,994 | B1 * | 9/2003 | Nussbaum | E06B 3/5864 292/171 |
| 7,950,439 | B2 * | 5/2011 | Anderson | E05D 15/58 160/195 |
| 8,756,865 | B2 * | 6/2014 | Nicholson | E05D 15/48 49/180 |
| 8,997,400 | B2 * | 4/2015 | Louie | E05C 1/08 49/169 |
| 10,280,678 | B1 * | 5/2019 | Rendon, Jr. | E06B 3/509 |
| 10,661,881 | B2 * | 5/2020 | Gallagher, Jr. | B64C 1/1469 |
| 10,900,268 | B2 | 1/2021 | Colligan | |
| 11,667,369 | B2 * | 6/2023 | Gallagher, Jr. | E06B 7/32 244/118.5 |
| 2008/0250716 | A1 | 10/2008 | Ranaudo et al. | |
| 2020/0131842 | A1 * | 4/2020 | Thomas | E06B 9/52 |

* cited by examiner

SLIDING DOOR WITH EMERGENCY SWING FEATURE

FIELD OF THE INVENTION

The present invention relates generally to a sliding door, and more particularly to a sliding door that possesses an emergency swing feature, such that in the event that the sliding door is barricaded from inside a room (e.g., by wedging paper or other items between the door and the door frame, by affixing an element to an inner surface of the door such that the element contacts the frame, thereby preventing sliding, etc.), the door may be swung outwardly by authorized personnel in order to access the barricaded room. Optimally, the sliding door of the present invention employs a sliding assembly that both avoids derailment problems and has anti-ligature characteristics that make it difficult for ropes, cords, wires, articles of clothing or other pieces of material (hereinafter referred to as “ligatures”) to be tied or looped around the door hardware, whether intentionally or unintentionally, to cause harm to persons having access thereto.

BACKGROUND OF THE INVENTION

Sliding doors have been gaining popularity in recent years and provide several benefits over traditional hinged, swing-type doors. In particular, surface-mounted sliding doors are used in a number of different applications.

For example, barn style doors are becoming increasingly popular as interior doors within homes, offices, hotels, and the like. Barn style doors generally hang from multiple wheels (typically from two to four) that ride along a rail mounted above the door opening. In many cases, the bottom of the door is not attached to a track or the like, and thus, the bottom of the door is able to swing outwardly about the top track.

Certain mechanisms may be included to provide some level of protection against the doors slipping off the tracks. For example, the wheels may be provided with a circumference having a convex surface, with the rail being provided with a corresponding curved shape so that rail fits within the convex surface of the wheels, or the rail may be provided with a U-shaped cross-section in which the wheels sit.

However, if the door is jarred with enough force, one or more of the wheels may slip off the rail. This may lead to one side of the door contacting the ground, making it difficult, if not impossible, to open or close the door, potentially leading to a person becoming trapped within a room. Even more disadvantageously, if all of the wheels slip off the rail, the entire door may fall, thereby crushing anyone near the door. Given that some doors may weigh upwards of 200 or even 250 pounds, this may cause significant injury, or even death, particularly in the case of small children. Moreover, even for designs that are relatively successful at keeping the wheels from slipping off the rail, the wheel connectors are nevertheless known for frequently jamming or breaking.

Another increasingly popular use of sliding doors is at locations where there is an increased risk that individuals will use a door to harm themselves. In many environments, such as, for example, medical facilities, schools, jails, offices, government buildings, residences, and other institutions, there exists a population of people at risk of trying to injure or kill themselves. In many psychiatric hospitals, for example, patients have been known to attempt suicide, often via hanging, while in the care of the institution.

These suicide attempts are known to have involved the use of doorknobs, hinges, and other door hardware. To attempt suicide, a person may wrap a ligature, such as a belt (or any other type of ligature), around a doorknob or hinge in order to hang himself/herself. Institutions have many private rooms where such a suicide attempt may take place, such as bathrooms. Every private room cannot be watched at the same time without enormous staff resources. Therefore, private rooms, and the door hardware in them, can provide an opportunity for a suicide attempt.

This problem of suicide attempts has been addressed in many institutions by simply removing all door hardware, and sometimes, even the doors themselves. While this may reduce the opportunity for suicide attempts, it also eliminates all privacy and security.

Some traditional designs for anti-suicide door hardware have included flush-mounting, low profiles, and steep angles to inhibit the affixing of a ligature. However, these traditional designs failed to fully inhibit the ability of a person to use door hardware for attempting suicide. Furthermore, in an attempt to make the door hardware difficult to use for the purpose of attempting suicide, some traditional designs made normal operation of the door hardware difficult. Moreover, traditional designs were not particularly well-adapted for surface-mounted sliding doors, which present issues not presented by other types of doors.

Many of the problems associated with traditional designs for sliding doors (and the anti-suicide door hardware that may be associated therewith) were addressed in U.S. Pat. No. 10,900,268 entitled “Sliding Door System,” in which is disclosed a door that includes a horizontally elongated member having a mounting portion with which it is mounted to a support structure, and a horizontally elongated track extending downwardly therefrom. The horizontally elongated track includes a horizontally elongated upper portion having a width, and a horizontally elongated protuberance below the upper portion having a width greater than the width of the upper portion. At least one sliding element is mounted to the top of the door and has a channel corresponding to the protuberance, and in which part of the elongated protuberance is disposed such that the sliding element is retained by and slidable on the protuberance. In some embodiments of U.S. Pat. No. 10,900,268, a vertically extending rod is concealed between the front and back walls of the door and can be moved vertically in and out of an aperture in the protuberance to lock and unlock the door.

Thus, U.S. Pat. No. 10,900,268 advantageously provides a sliding door system that can be used in retrofit situations (e.g., where standard wall openings are provided), instead of requiring openings that have been particularly adapted for use with pocket-type doors, that provides enhanced protection against the door becoming partially or fully disengaged from the mounting system, thereby providing enhanced reliability and a lower chance of accidental injury, and that provides for a design that possesses anti-ligature characteristics.

Nevertheless, while U.S. Pat. No. 10,900,268 provides for numerous advantages over traditional sliding door designs, there is still at least one potential issue not addressed thereby. Specifically, there is a population of individuals (which includes significant overlap with the population of individuals who are potentially interested in causing self-harm) who may want to barricade themselves within a room. In the case of a sliding door, this may be achieved in a variety of ways. For example, a paper product (such as a magazine, pages of a book, legal documents, etc., which may or may not be folded up), a wood, metal or plastic product (which may or may not be tapered into a wedge-shape), one or more coins, or the like may be wedged between the inner surface of the sliding door and the door frame. If the material is wedged with sufficient force to create substantial frictional forces, it may become difficult or impossible for the sliding door to be slid open. As another example, it may be possible for a person inside the room to create a hole or the like in the door (depending on the material from which it is made), and then to insert an article (which as a toothbrush, a pen, a marker or the like) into the hole, which article may then interact with the door frame, thereby preventing the sliding door from being slid open.

What would be desirable would be a sliding door (which may or may not be of the type disclosed in U.S. Pat. No. 10,900,268) that includes a safety feature, whereby a barricaded door may still be opened by authorized individuals.

SUMMARY OF THE INVENTION

In order to overcome the deficiencies of the prior art, the present invention is directed to a sliding door system, including a horizontally elongated rail adapted to be mounted with respect to a door opening and a door assembly slideably mounted on the rail and adapted to be slideable along a generally vertical imaginary plane. The door assembly includes an upper door section including at least one sliding element disposed along a top surface thereof, the sliding element cooperating with the rail to provide for the slideable mounting of the door assembly on the rail, and a lower door section pivotably attached to the upper door section at an attached end thereof so as to be pivotable with respect to the upper door section about a generally vertical axis from a closed position, in which the upper door section and the lower door section are generally co-planar, to an open position, the lower door section having a free end opposite the attached end. The door assembly also includes a safety release having an engaged position, in which the lower door section and the upper door section are fixed in the closed position, and having a disengaged position, in which the lower door section is pivotable to the open position.

In some embodiments, the door assembly has a private side and a public side, and the safety release is accessible only from the public side. In certain of these embodiments, the free end of the lower door section is pivotable with respect to the upper door section in a direction toward the public side upon disengagement of the safety release.

In some embodiments, the safety release comprises a member pivotably attached to the upper door section, and the member is pivotable between the engaged position, in which the member interacts the lower door section such that the lower door section is fixed with respect to the upper door section, and the disengaged position, in which the member no longer interacts the lower door section such that the lower door section is pivotable to the open position.

In certain embodiments, the member is pivotably attached to the upper door section by way of a fastener such that the member is moveable between the engaged position and the disengaged position when the fastener is loosened, and is fixed in position when the fastener is tightened.

In certain embodiments, the member is pivotably attached to the upper door section and the member is affixable to the lower door section by way of a fastener when the member is pivoted to the engaged position, such that the member is moveable between the engaged position and the disengaged position when the fastener is loosened, and is fixed in position when the member is pivoted to the engaged position and the fastener is tightened.

In certain embodiments, the member is pivotably attached within the upper door section by way of a rotatable cylinder. In certain of these embodiments, the rotatable cylinder is operable by a tool or a key.

In some embodiments, the door assembly includes a front wall and a back wall opposite the front wall, and the rail includes an aperture, with the system further comprising a vertically extending rod positioned between the front wall and the back wall of the door assembly, the rod having a top end, and an actuator located on at least one of the front wall and the back wall of the door assembly that moves the rod between an unlocked position and a locked position, such that when the actuator moves the rod from the unlocked position to the locked position, the actuator moves the rod upwardly such that the top end of the rod is advanced into the aperture of the rail, and when the actuator moves the rod from the locked position to the unlocked position, the actuator moves the rod downwardly such that the top end of the rod is withdrawn from the aperture of the rail.

In certain of these embodiments, the rod comprises an upper rod portion disposed within the upper door section, wherein the top end of the rod is defined by the upper rod portion, and a lower rod portion disposed within the lower door section, wherein the actuator cooperates with the lower rod portion. The upper rod portion and the lower rod portion are engageable when the lower door section is in the closed position so as to move together, whereby actuation of the actuator is translated into movement of the top end of the rod by way of simultaneous movement of the upper rod portion and the lower rod portion. The upper rod portion and the lower rod portion are disengageable so as to allow for the lower door section to be pivoted to the open position when the safety release is moved to the disengaged position.

In some embodiments, the upper rod portion and the lower rod portion are engageable and disengageable by way of cooperating magnets. In some embodiments, the actuator comprises a thumb-turn lock or a lever handle.

In some embodiments, a lower edge of the upper door section comprises a generally horizontally disposed protrusion or channel, an upper edge of the lower door section comprises a generally horizontally disposed protrusion or channel, and the protrusion or channel of the upper door section cooperates with the protrusion or channel of the lower door section when the lower door section is in the closed position, whereby sagging of the lower door section with respect to the upper door section is reduced. In certain of these embodiments, the door assembly has a private side and a public side, wherein the safety release is accessible only from the public side, and the protrusion or channel of the upper door section and the protrusion or channel of the lower door section are configured to as to prevent the free end of the lower door section from being pivotable with respect to the upper door section from the closed position in a direction toward the private side.

In some embodiments, the system further includes a threshold adapted to be mounted with respect to a floor of the door opening, the threshold having a groove formed therein, and the lower door section comprises a generally vertically disposed lip extending from a lower edge thereof, the lip being disposed within the groove formed in the threshold, so as to allow for relative sliding between the door assembly and the threshold, but so as to prevent swinging of the door assembly out of alignment with the threshold.

In certain of these embodiments, the lip is retractable out of the groove formed in the threshold, so as to allow for the lower door section to be pivoted to the open position when the safety release is in the disengaged position. In certain embodiments, the lip is defined by a plate pivotably attached to the lower door section, and the lip is retractable out of the groove by virtue of the plate defining the lip being pivoted from an extended position, in which the lip is disposed within the groove formed in the threshold, to a retracted position, in which the lip is retractable out of the groove formed in the threshold.

In some embodiments, the horizontally elongated rail comprises a mounting portion with which the rail is adapted to mounted to a support structure and a horizontally elongated track extending downwardly from the mounting portion, the horizontally elongated track comprising a horizontally elongated upper portion having a width, and a horizontally elongated protuberance below the upper portion having a width greater than the width of the upper portion. The at least one sliding element includes a channel corresponding to the horizontally elongated protuberance of the rail and in which part of the elongated protuberance is disposed such that the sliding element is retained by and slidable on the elongated protuberance.

In certain of these embodiments, the channel has a horizontally elongated opening along a top edge thereof that accommodates the horizontally elongated upper portion of the track as the at least one sliding element slides on the protuberance. In certain embodiments, the protuberance comprises a bulge, and the channel has a bulbous profile corresponding to the bulge.

In accordance with another aspect of the present invention, a sliding door system includes a horizontally elongated rail adapted to be mounted with respect to a door opening and a door assembly having a private side and a public side, the door assembly slideably mounted on the rail and adapted to be slideable along a generally vertical imaginary plane. The door assembly includes an upper door section comprising at least one sliding element disposed along a top surface thereof, the sliding element cooperating with the rail to provide for the slideable mounting of the door assembly on the rail, a lower door section pivotably attached to the upper door section at an attached end thereof so as to be pivotable with respect to the upper door section about a generally vertical axis from a closed position, in which the upper door section and the lower door section are generally co-planar, to an open position. The lower door section has a free end opposite the attached end, the free end being pivotable with respect to the upper door section in a direction toward the public side to the open position. The system also includes a safety release having an engaged position, in which the lower door section and the upper door section are fixed in the closed position, and having a disengaged position, in which the lower door section is pivotable to the open position. The safety release is accessible only from the public side of the door assembly and comprises a member pivotably attached to the upper door section, the member being pivotable between the engaged position, in which the member interacts with the lower door section such that the lower door section is fixed with respect to the upper door section, and the disengaged position, in which the member no longer interacts with the lower door section such that the lower door section is pivotable to the open position.

In some embodiments, the member is pivotably attached to the upper door section by way of a fastener such that the member is moveable between the engaged position and the disengaged position when the fastener is loosened, and is fixed in position when the fastener is tightened.

In some embodiments, the member is pivotably attached to the upper door section and the member is affixable to the lower door section by way of a fastener when the member is pivoted to the engaged position, such that the member is moveable between the engaged position and the disengaged position when the fastener is loosened, and is fixed in position when the member is pivoted to the engaged position and the fastener is tightened.

In certain embodiments, the member is pivotably attached within the upper door section by way of a rotatable cylinder. In certain of these embodiments, the rotatable cylinder is operable by a tool or a key.

In some embodiments, the door assembly includes a front wall and a back wall opposite the front wall, and the rail includes an aperture, the system further comprising: a vertically extending rod positioned between the front wall and the back wall of the door assembly, the rod having a top end. An actuator located on at least one of the front wall and the back wall of the door assembly moves the rod between an unlocked position and a locked position, wherein, when the actuator moves the rod from the unlocked position to the locked position, the actuator moves the rod upwardly such that the top end of the rod is advanced into the aperture of the rail, and when the actuator moves the rod from the locked position to the unlocked position, the actuator moves the rod downwardly such that the top end of the rod is withdrawn from the aperture of the rail.

In certain of these embodiments, the rod comprises an upper rod portion disposed within the upper door section, wherein the top end of the rod is defined by the upper rod portion, and a lower rod portion disposed within the lower door section, wherein the actuator cooperates with the lower rod portion. The upper rod portion and the lower rod portion are engageable when the lower door section is in the closed position so as to move together, whereby actuation of the actuator is translated into movement of the top end of the rod by way of simultaneous movement of the upper rod portion and the lower rod portion, and the upper rod portion and the lower rod portion are disengageable so as to allow for the lower door section to be pivoted to the open position when the safety release is moved to the disengaged position. In certain embodiments, the upper rod portion and the lower rod portion are engageable and disengageable by way of cooperating magnets.

In some embodiments, a lower edge of the upper door section comprises a generally horizontally disposed protrusion or channel, an upper edge of the lower door section comprises a generally horizontally disposed protrusion or channel, and the protrusion or channel of the upper door section cooperates with the protrusion or channel of the lower door section when the lower door section is in the closed position, whereby sagging of the lower door section with respect to the upper door section is reduced.

In certain of these embodiments, the safety release is accessible only from the public side of the door assembly, and the protrusion or channel of the upper door section and the protrusion or channel of the lower door section are configured to as to prevent the free end of the lower door section from being pivotable with respect to the upper door section from the closed position in a direction toward the private side.

In some embodiments, a threshold is adapted to be mounted with respect to a floor of the door opening, the threshold having a groove formed therein, and the lower door section comprises a generally vertically disposed lip extending from a lower edge thereof, the lip being disposed within the groove formed in the threshold, so as to allow for relative sliding between the door assembly and the threshold, but so as to prevent swinging of the door assembly out of alignment with the threshold.

In certain of these embodiments, the lip is retractable out of the groove formed in the threshold, so as to allow for the lower door section to be pivoted to the open position when the safety release is in the disengaged position. In certain embodiments, the lip is defined by a plate pivotably attached to the lower door section, and the lip is retractable out of the groove by virtue of the plate defining the lip being pivoted from an extended position, in which the lip is disposed within the groove formed in the threshold, to a retracted position, in which the lip is retractable out of the groove formed in the threshold.

Other features and advantages of the invention will become more apparent from consideration of the following drawings.

DETAILED DESCRIPTION OF THE INVENTION

The following detailed description illustrates the technology by way of example, not by way of limitation, of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1:
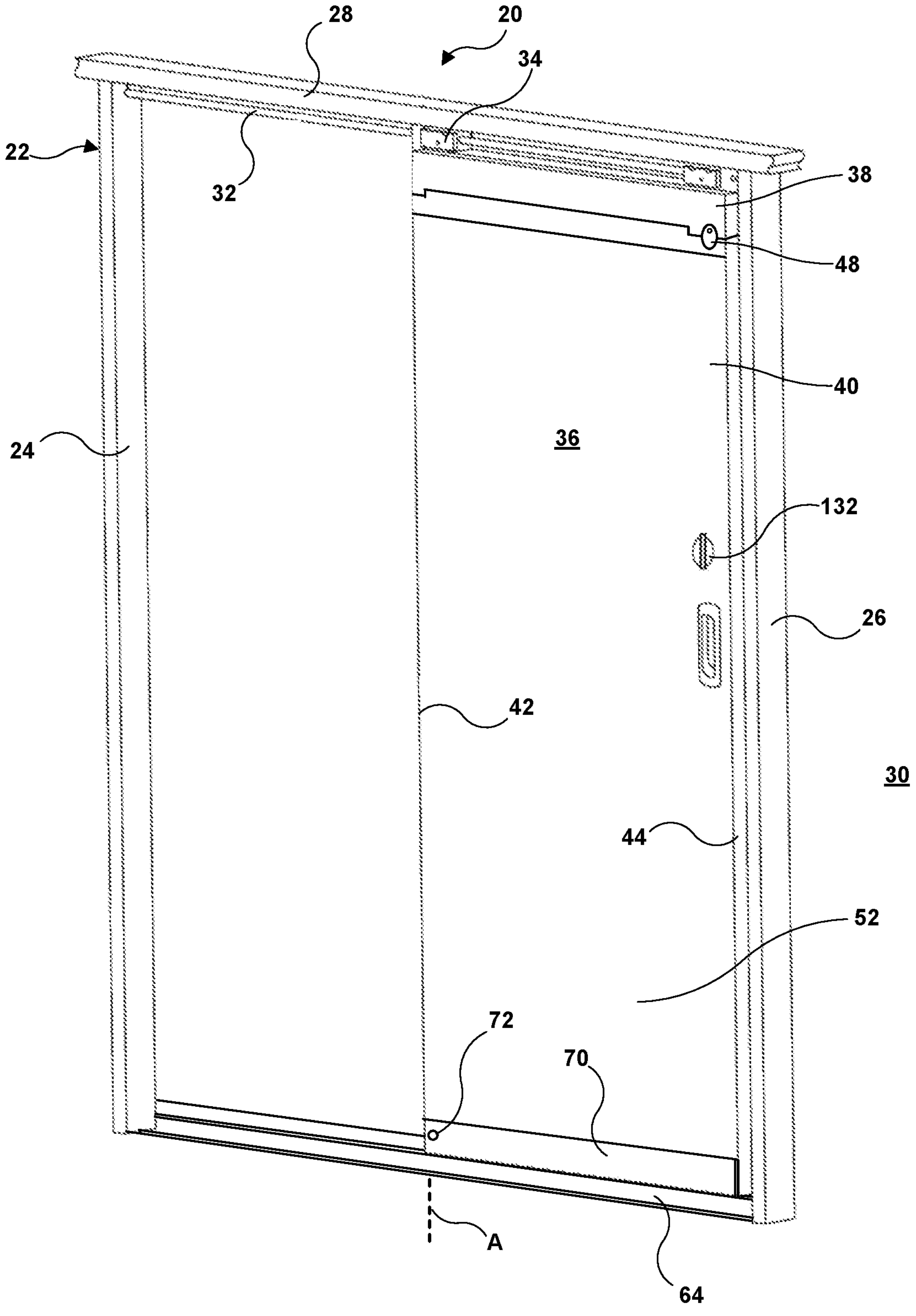
FIG. 1 is a perspective view of a sliding door system in accordance with one exemplary embodiment of the present invention shown in the closed position.

FIG. 1 illustrates one exemplary embodiment of a sliding door system (20) in accordance with one exemplary embodiment of the invention. In the illustrated embodiment, the system (20) includes a frame (22) having a left side portion in the form of a vertical stud (24), a right side portion in the form of another vertical stud (26), and a top portion in the form of a horizontal beam or header (28) supported by the side studs (24, 26). The frame (22) can be surface-mounted to a wall (30) to cover an opening provided therein or retrofit within an existing doorway.

A horizontally elongated rail (32) is mounted to the header (28) of the frame (22), and at least one sliding element (34) is mounted to the top surface of a door assembly (36). The horizontally elongated rail (32) and the at least one sliding element (34) cooperate with one another such that the door assembly (36) is slidable relative to the frame (22) within a generally vertical plane (i.e., the plane in which lies the door assembly (36) in FIG. 1), as is further described below. The various parts of the horizontally elongated rail (32) and the at least one sliding element (34), further described below, are preferably fashioned from metal, such as steel and/or aluminum.

Since the sliding operation of door assemblies is extremely well known, with the sliding door assembly shown and described in commonly owned U.S. Pat. No. 10,900,268, titled "Sliding Door System," being but one example, said traditional sliding operation is not described herein in detail. Instead, focus will be placed upon the safety "swinging" feature of the inventive sliding door assembly, whereby a barricaded door may still be opened by authorized individuals via a swinging operation (e.g., when traditional sliding operation is inhibited).

Figure 2:
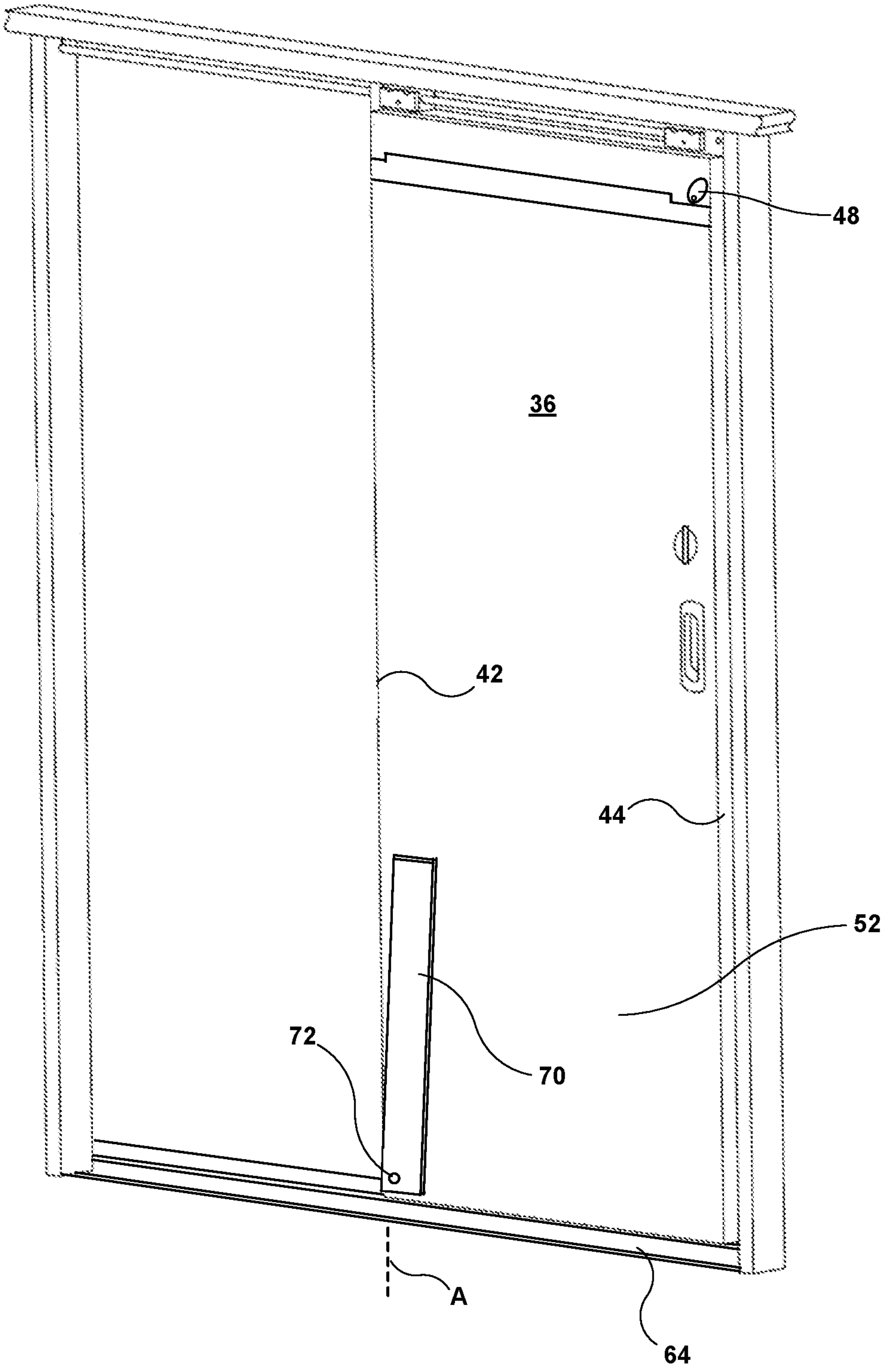
FIG. 2 is a perspective view of the sliding door system shown in FIG. 1, wherein a safety feature, whereby a barricaded door may still be opened by authorized individuals, is in the process of being employed.
Figure 3:
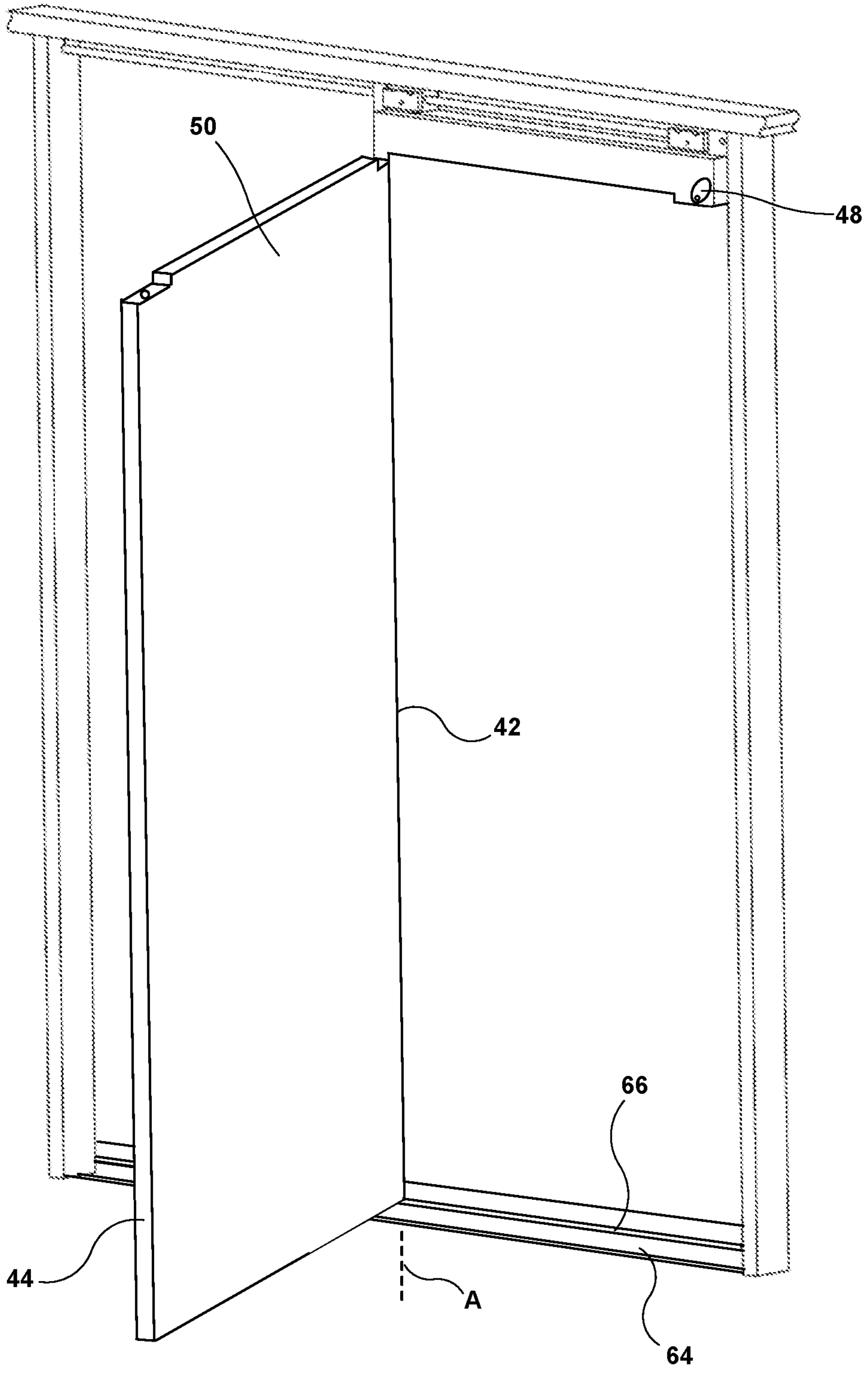
FIG. 3 is a perspective view of the sliding door system shown in FIG. 1, wherein the safety feature, whereby a barricaded door may still be opened by authorized individuals, has been employed such that the door is swung open.

The door assembly (36) is defined by an upper door section (38), on which is mounted the at least one sliding element (34) along a top surface thereof, the at least one sliding element (34) cooperating with the elongated rail (32) to provide for the slideable mounting of the door assembly (36) on the elongated rail (32), and a lower door section (40) pivotably attached to the upper door section (38) at an attached end (42) thereof so as to be pivotable with respect to the upper door section (38) about a generally vertical axis (A) from a closed position (shown in FIGS. 1 and 2) wherein the upper door section (38) and the lower door section (40) are generally co-planar, to an open position (shown in FIG. 3). As best seen in FIG. 3, the lower door section (40) has a free end (44) opposite the attached end (42).

Figure 4A:
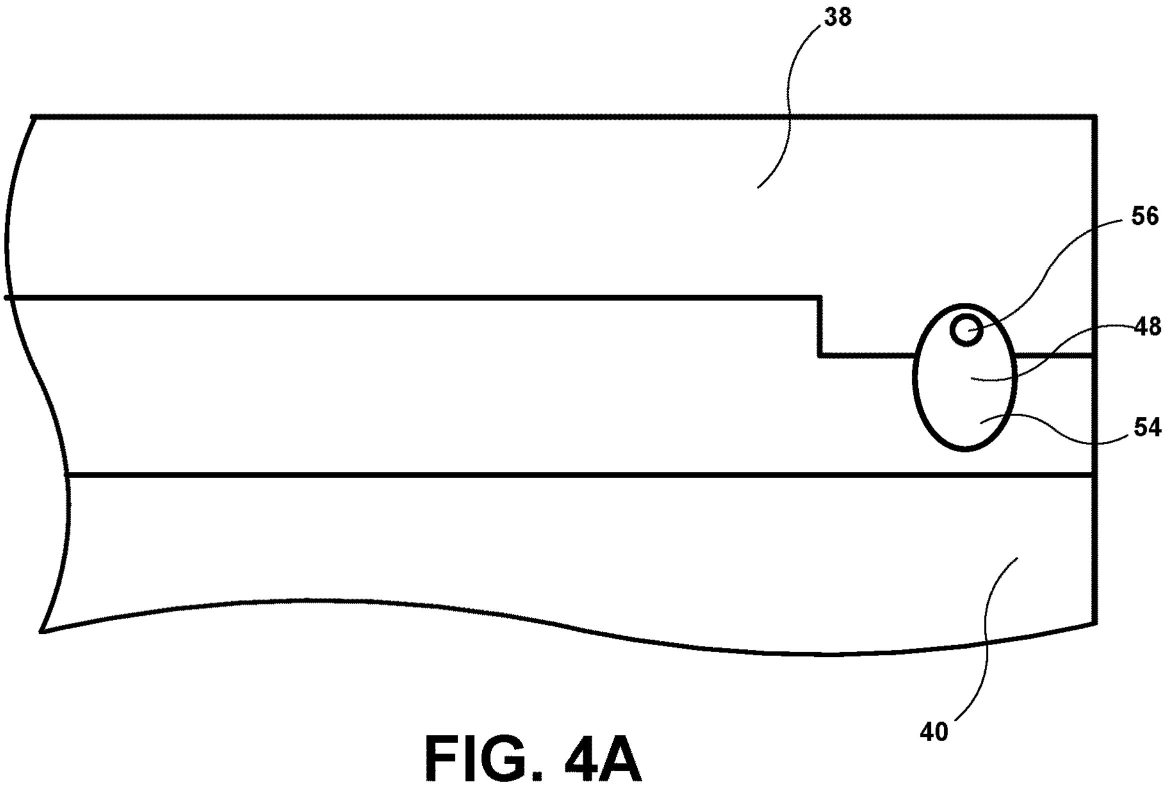
FIG. 4A is a side elevational view of a portion of the sliding door system of FIG. 1, showing a safety release feature of the sliding door system in an engaged position.
Figure 4B:
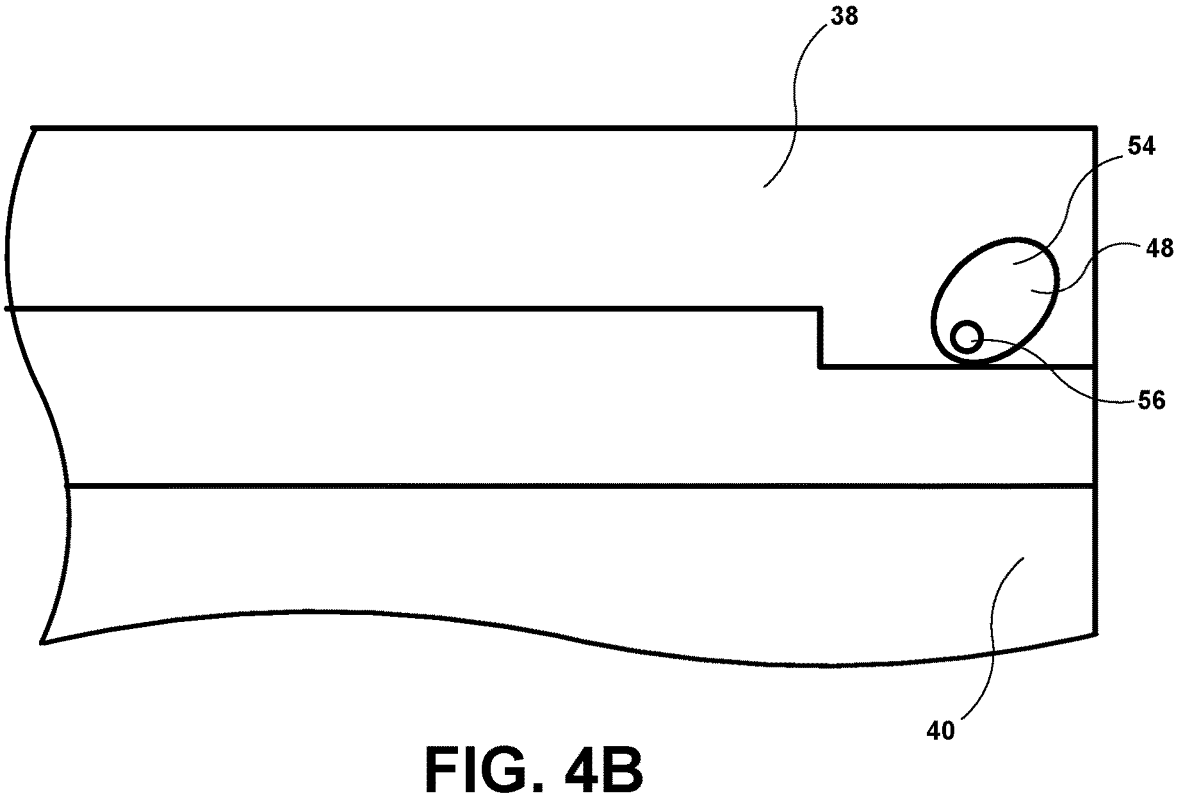
FIG. 4B is a side elevational view similar to FIG. 4A, but showing the safety release feature of the sliding door system in a disengaged position.

Referring now to FIGS. 4A and 4B in addition to FIGS. 1-3, a safety release (48) is provided having an engaged position (shown in FIGS. 1 and 4A) wherein the lower door section (40) and the upper door section (38) are fixed in the closed position (shown in FIGS. 1 and 2) and having a disengaged position (shown in FIGS. 2, 3 and 4B) wherein the lower door section (40) is pivotable to the open position (shown in FIG. 3). The safety release (48), its operation and various embodiments thereof will now be described.

The door assembly (36) has a private side (50), which can generally be considered to be the bedroom, hospital room, cell, or the like in an institution or the like in which a person resides, and a public side (52) which generally would face a hallway, a corridor, common area, or the like and that is generally accessible by institutional staff, such as doctors, nurses, guards, orderlies, etc. Generally, since the door assembly (36) would typically be barricaded, if at all, on the private side (50), the door assembly (36) is configured such that the free end (44) of the lower door section (40) is pivotable with respect to the upper door section (38) in a direction toward the public side (52) upon disengagement of the safety release (48), as best seen in FIG. 3, whereupon items used to barricade the door assembly (36) can be removed.

The safety release (48) itself can take any of various forms, so long as it is readily operable in the case of an emergency. With respect, specifically, to FIGS. 4A and 4B, the safety release (48) takes the form of a generally oblong plate (54) pivotably attached to the upper door section (38). The plate (54) is pivotable to the engaged position (shown in FIGS. 1 and 4A), in which the plate overlies the lower door section (40) such that the lower door section (40) is fixed with respect to the upper door section (38), in that the lower door section (40) cannot be pivoted with respect to the upper door section (38). The plate (54) is also pivotable to the disengaged position (shown in FIGS. 2, 3 and 4B), in which the plate (54) no longer overlies the lower door section (40) such that the lower door section (40) is pivotable toward the public side (52) of the door assembly (36) to the open position (shown in FIG. 3).

In order to inhibit unauthorized pivoting operation of the door assembly (36), and to ensure that pivoting operation is used only when necessary (e.g., when sliding is prevented due to a barricade situation), the plate (54) may be pivotably attached to the upper door section (38) by way of a fastener (56), such that the plate (54) is moveable between the engaged position and the disengaged position when the fastener (56) is loosened, and is fixed in position when the fastener (56) is tightened. This configuration may ensure that only individuals possessing a tool needed to loosen the fastener (56) can operate the pivoting safety feature of the door assembly (36). The fastener (56) may be of a type such that a relatively common tool may be required to operate the safety release (48), such as a Philips head screw, a flat head screw, a hex head screw, a hex bolt, etc. Or if heightened security is desired, the fastener (56) may be a tamper resistant fastener of a type such that a specialized tool is required, such as a security torx head screw, a snake eye screw, a pin head hex screw, etc. The exact type of tamper resistant fastener used is unimportant. What is important, however, is that the tool required to loosen the fastener (56) is not readily available to persons in the hospital, prison, mental institution or the like, but is fairly readily available to authorized personnel.

Figure 4C:
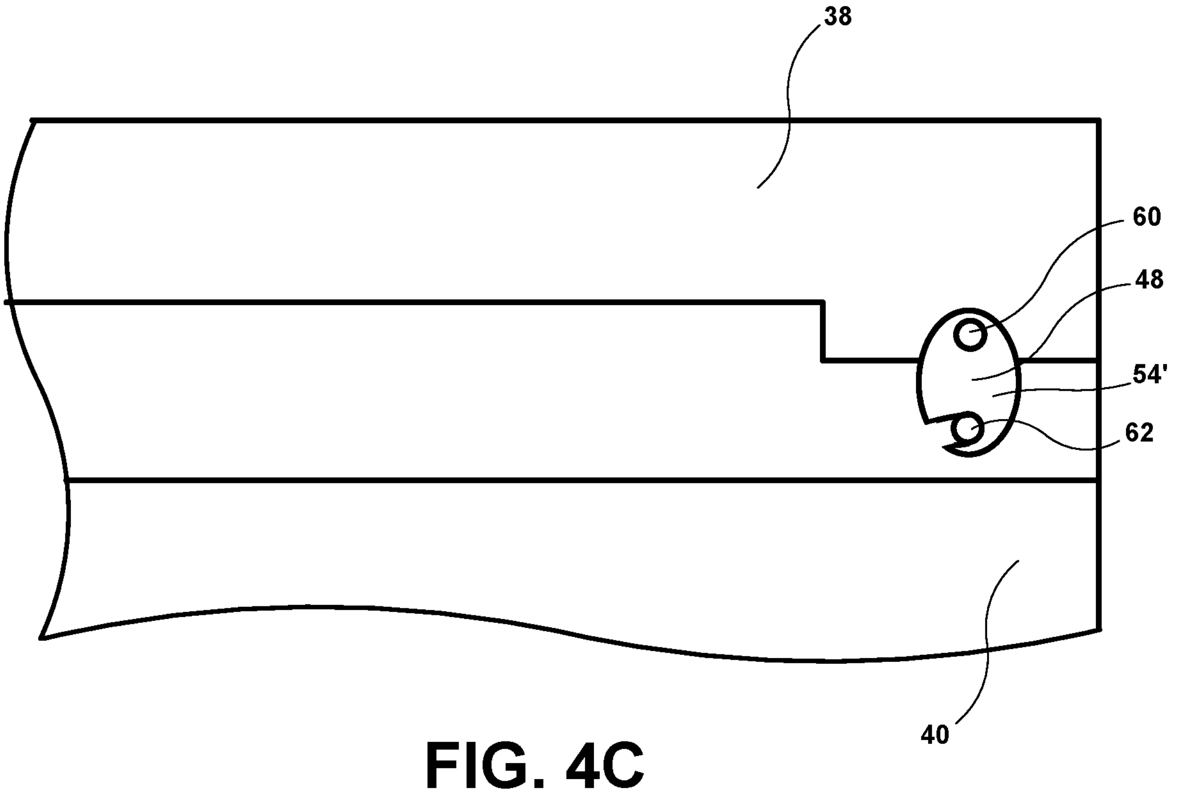
FIG. 4C is a side elevational view of a portion of the sliding door system of FIG. 1, showing an alternate safety release feature of the sliding door system in an engaged position.
Figure 4D:
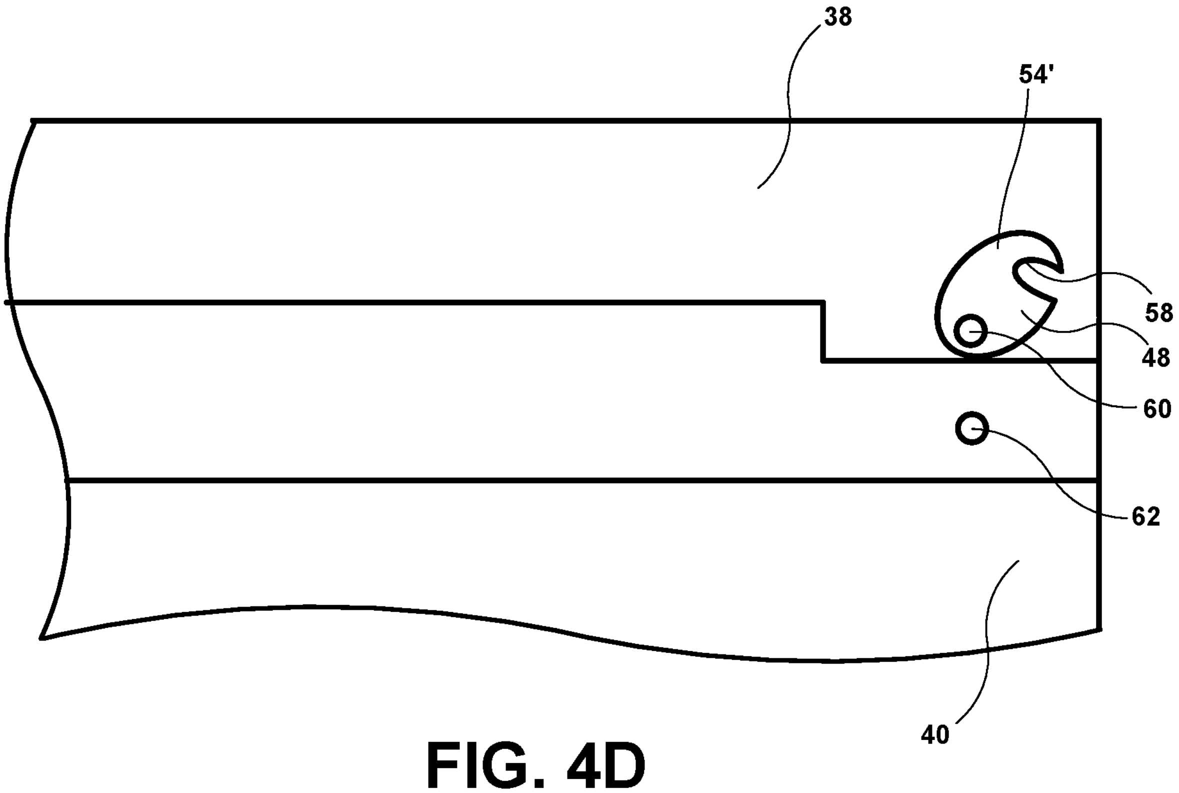
FIG. 4D is a side elevational view similar to FIG. 4C, but showing the safety release feature of the sliding door system in a disengaged position.

Referring now specifically to FIGS. 4C and 4D, a modified plate (54') is shown, which includes a cutout (58) toward an end thereof. The plate (54') is pivotably attached to the upper door section (38) by way of some pivot mechanism (60), which may be a fastener in similar fashion to the plate (54) shown in FIGS. 4A and 4B; or pivot mechanism (60) may take some other form, such as a pin. As with the plate (54) shown in FIGS. 4A and 4B, the plate (54') is pivotable to the engaged position (shown in FIG. 4C), in which the plate (54') overlies the lower door section (40) such that the lower door section (40) is fixed with respect to the upper door section (38), in that the lower door section (40) cannot be pivoted with respect to the upper door section (38). The plate (54') is also pivotable to the disengaged position (shown in FIG. 4D), in which the plate (54') no longer overlies the lower door section (40) such that the lower door section (40) is pivotable toward the public side (52) of the door assembly (36) to the open position (shown in FIG. 3).

In the embodiment shown in FIGS. 4C and 4D, the plate (54'), is affixable to the lower door section (40) by way of a fastener (62) when the plate (54') is pivoted to the engaged position (shown in FIG. 4D), such that the plate (54') is moveable between the engaged position and the disengaged position when the fastener (62) is loosened or removed and is fixed in position when the plate (54') is pivoted to the engaged position and the fastener (62) is tightened. As seen in the FIGS., the provision of cutout (58) in alignment with the fastener (62) as the plate is pivoted from the disengaged position (shown in FIG. 4D) to the engaged position (shown in FIG. 4C) and vice versa, allows for the plate (54) to be moved to the engaged position (shown in FIG. 4C) by merely loosening the fastener (62) without requiring complete removal of the fastener (62).

As with the fastener (56) shown in FIGS. 4A and 4B, the fastener (62) may be of a type such that a relatively common tool may be required to operate the safety release (48), such as a Philips head screw, a flat head screw, a hex head screw, a hex bolt, etc. Or if heightened security is desired, the fastener (62) may be a tamper resistant fastener of a type such that a specialized tool is required, such as a security torx head screw, a snake eye screw, a pin head hex screw, etc.

Figure 5A:
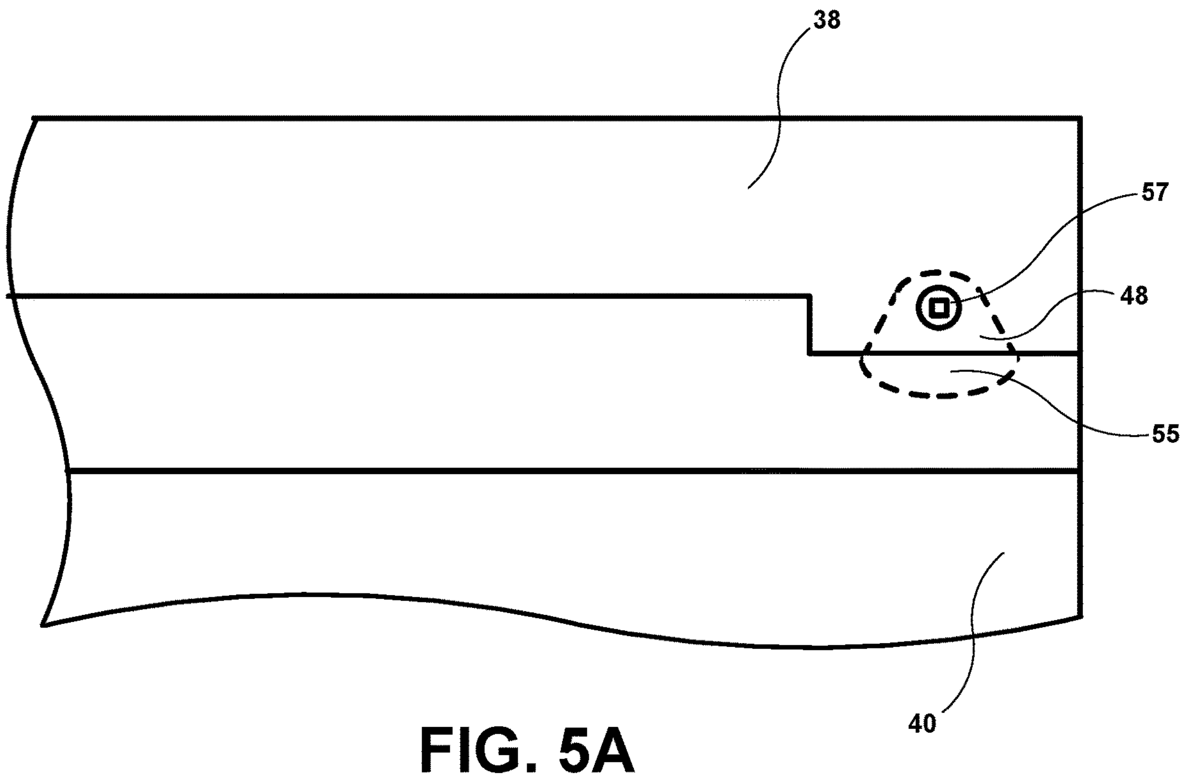
FIG. 5A is a side elevational view of a portion of the sliding door system of FIG. 1, showing an internal a safety release feature of the sliding door system in an engaged position.
Figure 5B:
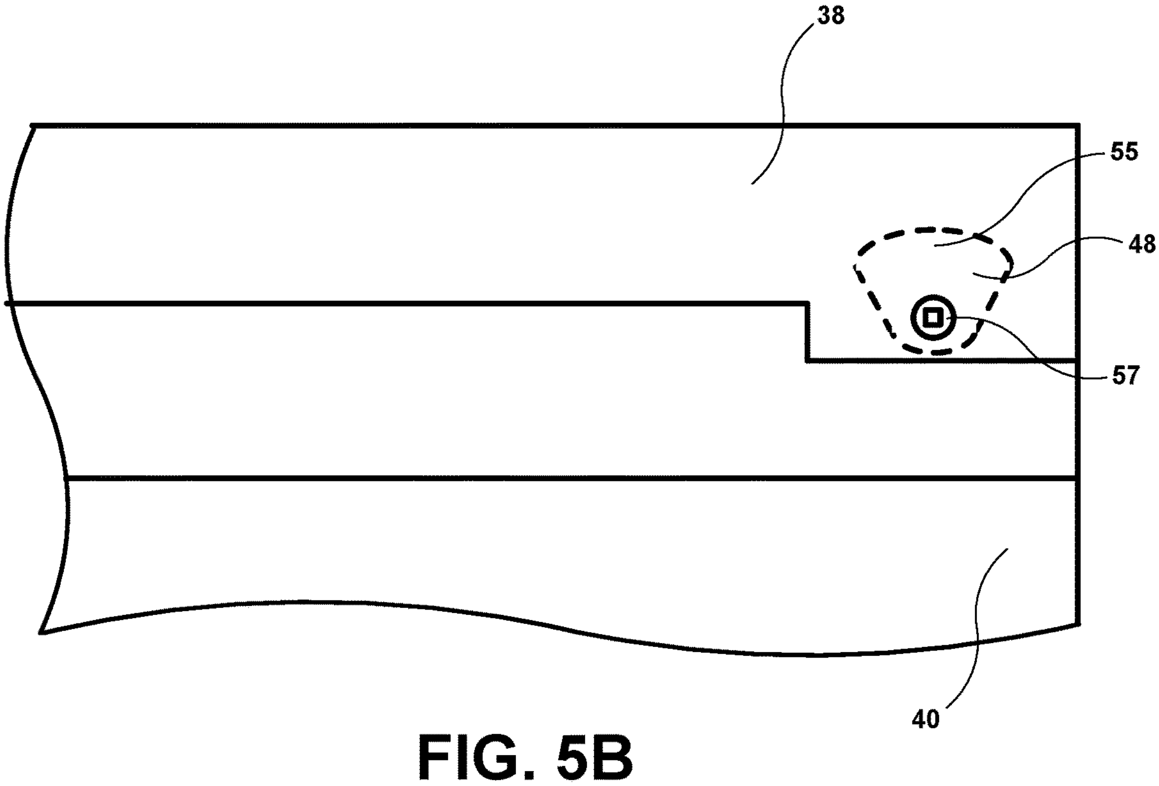
FIG. 5B is a side elevational view similar to FIG. 5A, but showing the internal safety release feature of the sliding door system in a disengaged position.

Referring now specifically to FIGS. 5A and 5B, a modified safety release (48) is shown. Unlike the plates (54, 54') of the previously described embodiments, which are mounted on a surface of the upper door section (38) the embodiment shown in FIGS. 5A and 5B employs an internally disposed member (55) that is located within corresponding recesses in the upper door section (38) and the lower door section (40). The internally disposed member (55) is attached to the upper door section (38) by way of a cylinder (57) having a portion thereof that is accessible from outside the door assembly (36), preferably from the public side (52) thereof. In the illustrated embodiment, the cylinder (57), and consequently the internally disposed member (55), is operable by way of a square socket tool (for example, an 8 mm square socket tool). Also, in the illustrated embodiment, the internally disposed member (55) is generally shaped as a rounded triangle, though other configurations are contemplated.

As with the plates (54, 54') described above, internally disposed member (55) is pivotable to the engaged position (shown in FIG. 5A), in which the internally disposed member (55) interacts with the recess provided in the lower door section (40) such that the lower door section (40) is fixed with respect to the upper door section (38), in that the lower door section (40) cannot be pivoted with respect to the upper door section (38). The internally disposed member (55) is also pivotable to the disengaged position (shown in FIG. 5B), in which the internally disposed member (55) no longer interacts with the recess provided in the lower door section (40) such that the lower door section (40) is pivotable toward the public side (52) of the door assembly (36) to the open position (shown in FIG. 3).

Figure 5C:
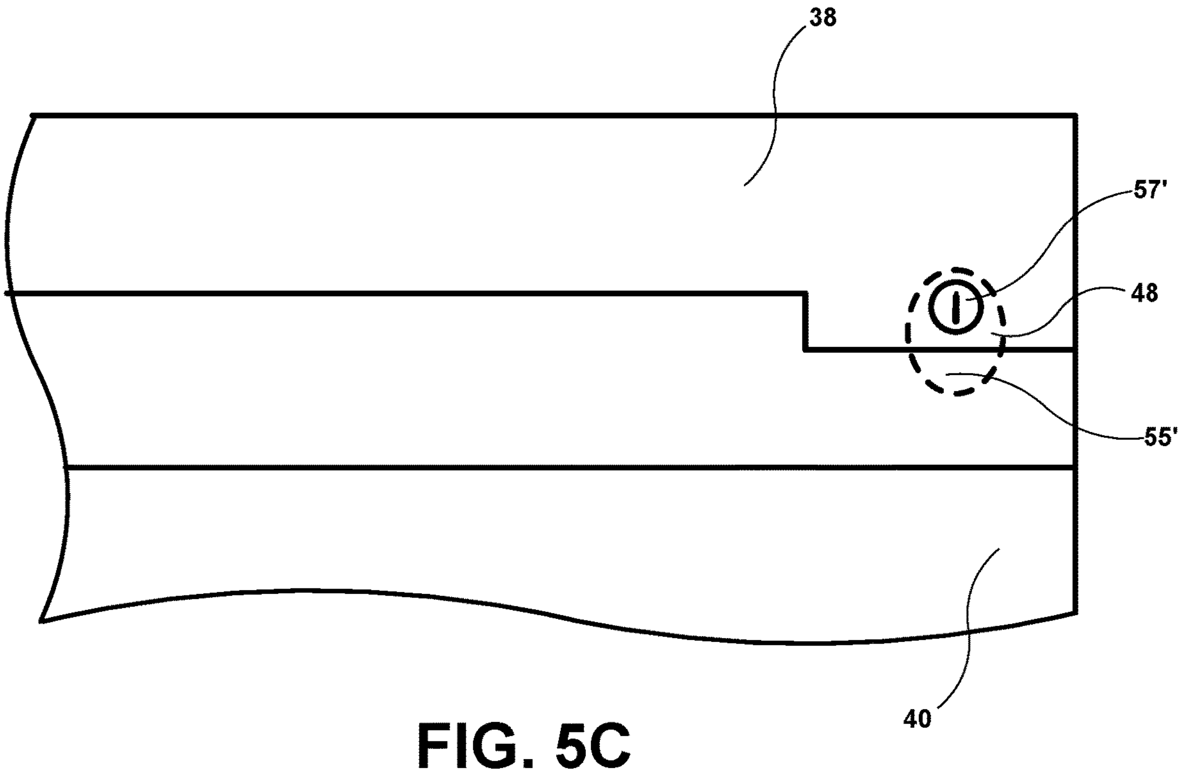
FIG. 5C is a side elevational view of a portion of the sliding door system of FIG. 1, showing an alternate interna; safety release feature of the sliding door system in an engaged position.
Figure 5D:
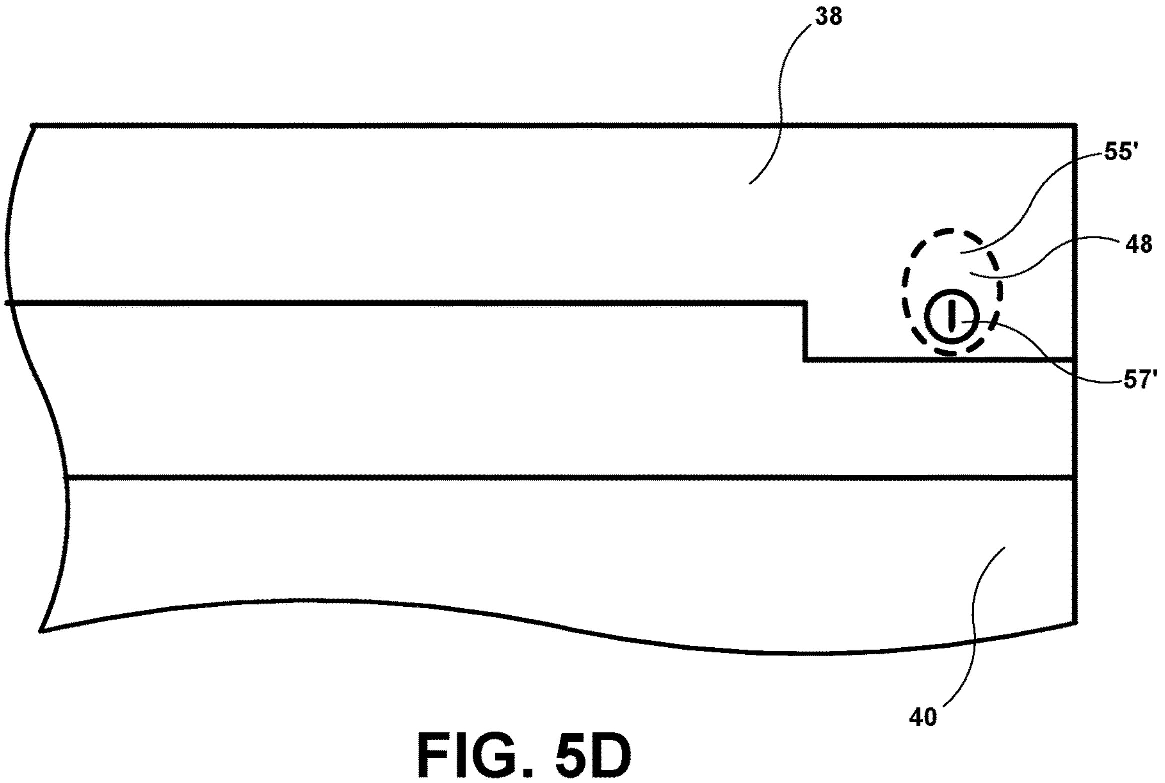
FIG. 5D is a side elevational view similar to FIG. 5C, but showing the internal safety release feature of the sliding door system in a disengaged position.

Referring now specifically to FIGS. 5C and 5D, a modified internally disposed member (55') is shown, having a generally oval shape. Of course, many other shapes are contemplated, including shapes typically used in connection with cam arrangements. As with the embodiment shown in FIGS. 5A and 5B, the internally disposed member (55') is attached to the upper door section (38) by way of a modified cylinder (57') having a portion thereof that is accessible from outside the door assembly (36), preferably from the public side (52) thereof. In the illustrated embodiment, this modified cylinder (57'), and consequently the internally disposed member (55'), is operable by way of a key, such as a traditional key for use with keyed lock cylinders.

As with the embodiment described above in connection with FIGS. 5A and 5B, the internally disposed member (55') is pivotable to the engaged position (shown in FIG. 5C), in which the internally disposed member (55') interacts with the recess provided in the lower door section (40) such that the lower door section (40) is fixed with respect to the upper door section (38), in that the lower door section (40) cannot be pivoted with respect to the upper door section (38). The internally disposed member (55') is also pivotable to the disengaged position (shown in FIG. 5D), in which the internally disposed member (55') no longer interacts with the recess provided in the lower door section (40) such that the lower door section (40) is pivotable toward the public side (52) of the door assembly (36) to the open position (shown in FIG. 3).

Figure 6:
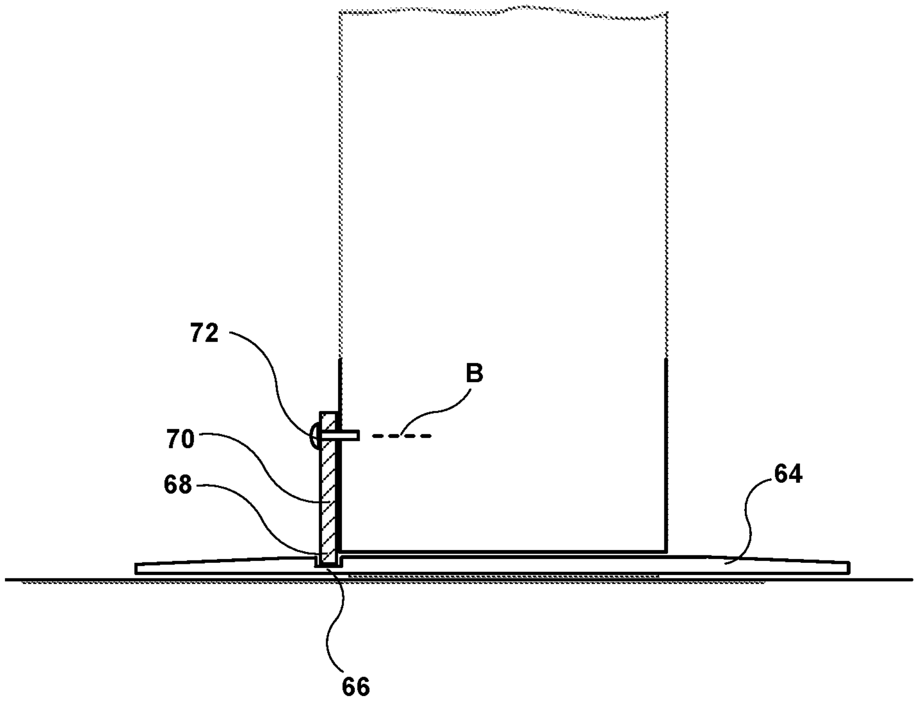
FIG. 6 is an end schematic view, partially broken away, of a portion of the sliding door system of FIG. 1, showing a cooperating threshold/lip arrangement, which inhibits lateral swinging of the door.

Referring now to FIGS. 1, 2 and 6, another aspect of the present invention is shown. Specifically, in certain situations it may be desirable to inhibit lateral (i.e., outward) swinging of the door assembly, for example by lateral forces applied to the door assembly (36), such as may occur in patient environments. Such may be accomplished by provision of a threshold (64) adapted to be mounted with respect to a floor of the door opening, the threshold (64) having a groove (66) formed therein. The lower door section (40) includes a generally vertically disposed lip (68) extending from a lower edge thereof (best seen in FIG. 6), which lip (68) is disposed within the groove (66) formed in the threshold (64), so as to allow for relative sliding between the door assembly (36) and the threshold (64), but so as to inhibiting lateral swinging of the door assembly (36) out of alignment with the threshold (64), for example, when lateral forces are applied to the door assembly (36).

Of course, in addition to inhibiting lateral swinging of the door assembly when lateral forces are applied thereto, the engagement of the lip (68) with the groove (66) in the threshold (64) would also inhibit emergency pivoting of the lower door section (40) with respect to the upper door section (38) when desired (e.g., when sliding is prevented due to a barricade situation). For this reason, the lip (68), when provided, is retractable out of the groove (66) formed in the threshold (64) by authorized personnel, so as to allow for the lower door section (40) to be pivoted to the open position (shown in FIG. 3) when the safety release (48) is in the disengaged position (shown in FIGS. 2, 3, 4B, 4D, 5B and 5D). As with the safety release (48), the lip (68) is preferably only retractable from the public side (52), which generally would face a hallway, a corridor, common area, or the like and that is generally accessible by institutional staff, such as doctors, nurses, guards, orderlies, etc.

In the illustrated embodiment, the lip (68) is defined by a plate (70) pivotably attached to the lower door section (40), such that the plate is pivotable about an axis (B), best seen in FIG. 6, which is generally normal to the face of the lower door section (40). The lip (68) retractable out of the groove by virtue of the plate (70) defining the lip (68) being pivoted from an extended position wherein said lip (68) is disposed within the groove (66) formed in the threshold (64), as best seen in FIGS. 1 and 6, to a retracted position, in which lip (68) is retracted out of the groove (66) formed in the threshold (64), as best seen in FIG. 2.

In order to inhibit unauthorized retraction of the lip (68) from the groove (66) in the threshold (64), and to ensure such retraction only when necessary, the plate (70) may be pivotably attached to the lower door section (40) by way of a fastener (72), such that the plate (70) is moveable between the lip extended position and the lip retracted position when the fastener (72) is loosened, and is fixed in position when the fastener (72) is tightened. This configuration may ensure that only individuals possessing a tool needed to loosen the fastener (72) can operate the lip retraction feature of the door assembly (36). The fastener (72) may be of a type such that a relatively common tool may be required to operate the lip retraction feature, such as a Philips head screw, a flat head screw, a hex head screw, a hex bolt, etc. Or if heightened security is desired, the fastener (72) may be a tamper resistant fastener of a type such that a specialized tool is required, such as a security torx head screw, a snake eye screw, a pin head hex screw, etc. The exact type of tamper resistant fastener used is unimportant. What is important, however, is that the tool required to loosen the fastener (72) is not readily available to persons in the hospital, prison, mental institution or the like, but is fairly readily available to authorized personnel.

Figure 7:
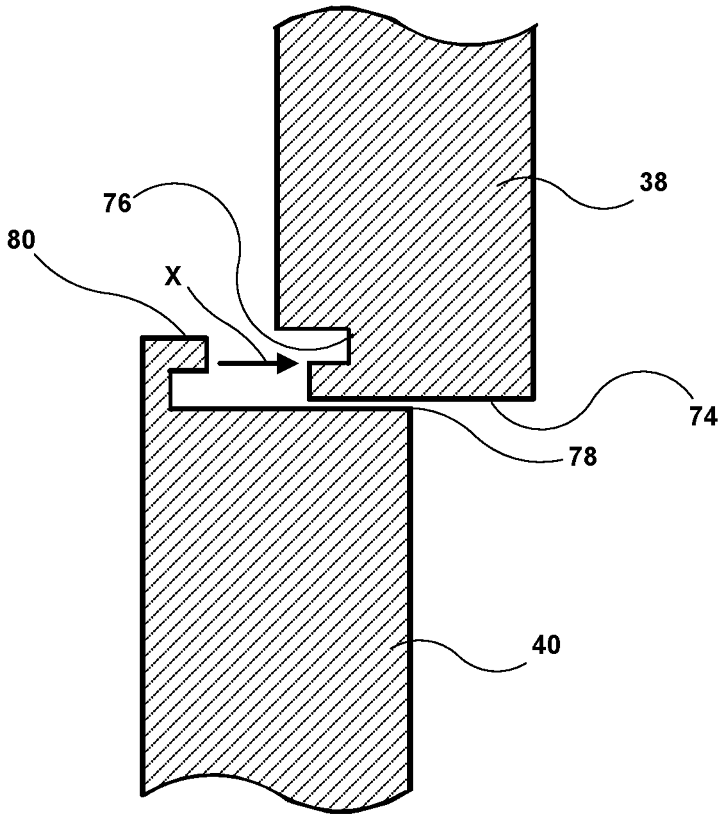
FIG. 7 is a schematic end view showing the cooperation between a lower edge of an upper door section and an upper edge of a lower door section as the lower door section is being closed to its closed position, as shown in FIG. 1.

Turning now specifically to FIG. 7, another feature of the inventive sliding door system (10) is shown. As will be recognized by those skilled in the art, since the lower door section (40) is pivotable attached to the upper door section (38) only at an upper end at the attached end (42) thereof, the weight of the lower door section (40) may tend to cause it to sag over time with respect to the upper door section (38), unless provision is made to inhibit such sagging. As such, a lower edge (74) of the upper door section (38) is provided with a generally horizontally disposed channel (76), while the upper edge (78) of the lower door section (40) is provided with a generally horizontally disposed protrusion (80).

As indicated by arrow (X), the protrusion (80) of the lower door section (40) and the channel (76) of the upper door section (38) cooperate with one another when the lower door section (40) is moved to the closed position (best seen in FIGS. 1 and 2), such that the weight of the lower door section (40) is supported by the cooperation of the protrusion (80) and channel (76), whereby sagging of the lower door section (40) with respect to the upper door section (38) is reduced. Also, as should be apparent from viewing FIG. 7, once the protrusion (80) of the lower door section (40) and the channel (76) of the upper door section (38) are fully engaged (i.e., when the lower door section (40) is moved to the in the closed position), further movement in the direction indicated by arrow (X) is prohibited by the cooperation of the protrusion (80) and channel (76), such that pivoting from the closed position toward the direction indicated by arrow (X) is not possible.

Of course, it should be recognized that the configuration may be reversed, while the same effect is achieved. For example, the channel may be provided in the upper edge (78) of the lower door section (40), while the protrusion may be provided in a lower edge (74) of the upper door section (38).

Figure 8:
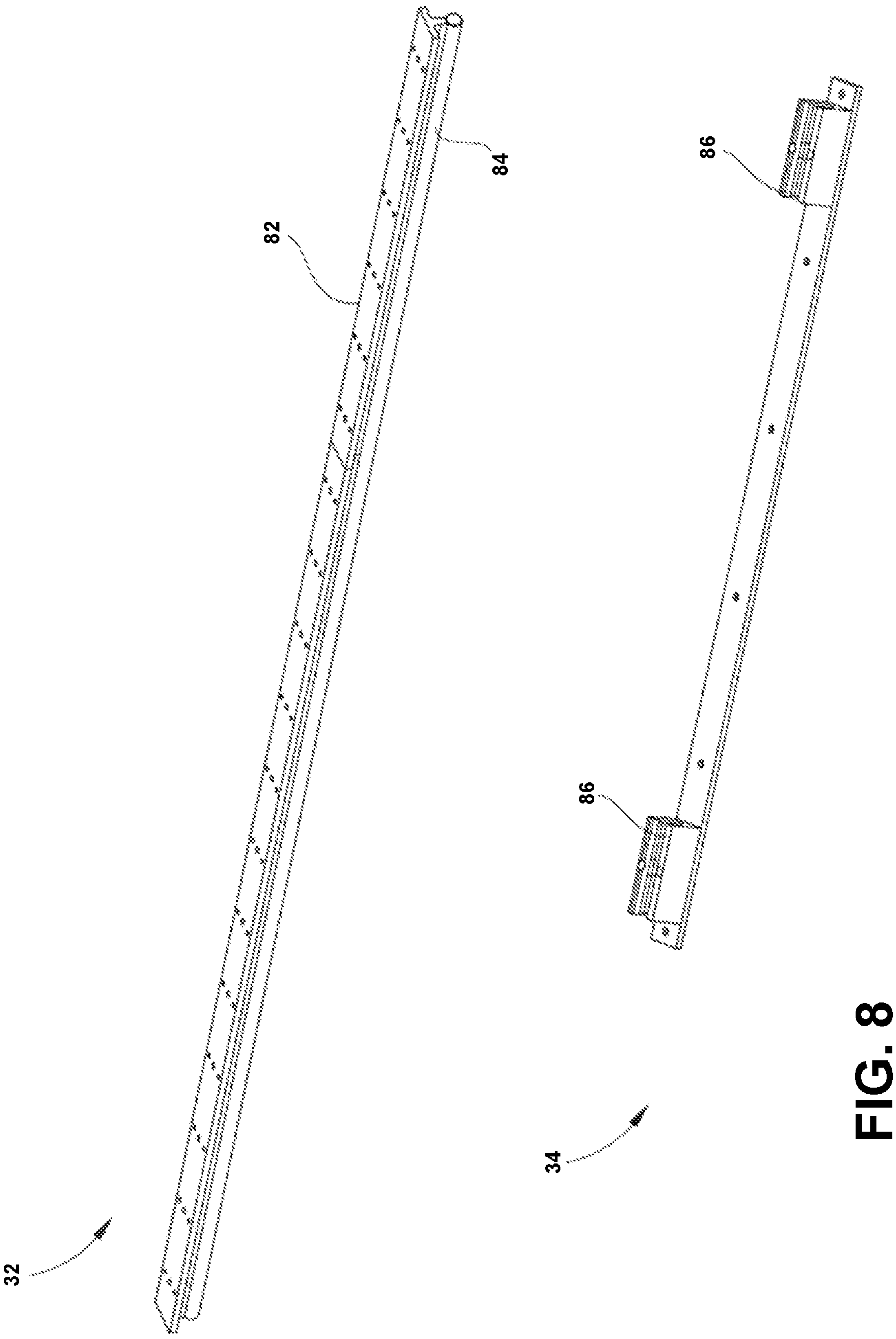
FIG. 8 is a perspective view of the elongated rail and sliding element features of the sliding door system of FIG. 1, which allow the door to be slideable along a generally vertical imaginary plane.
Figure 9:
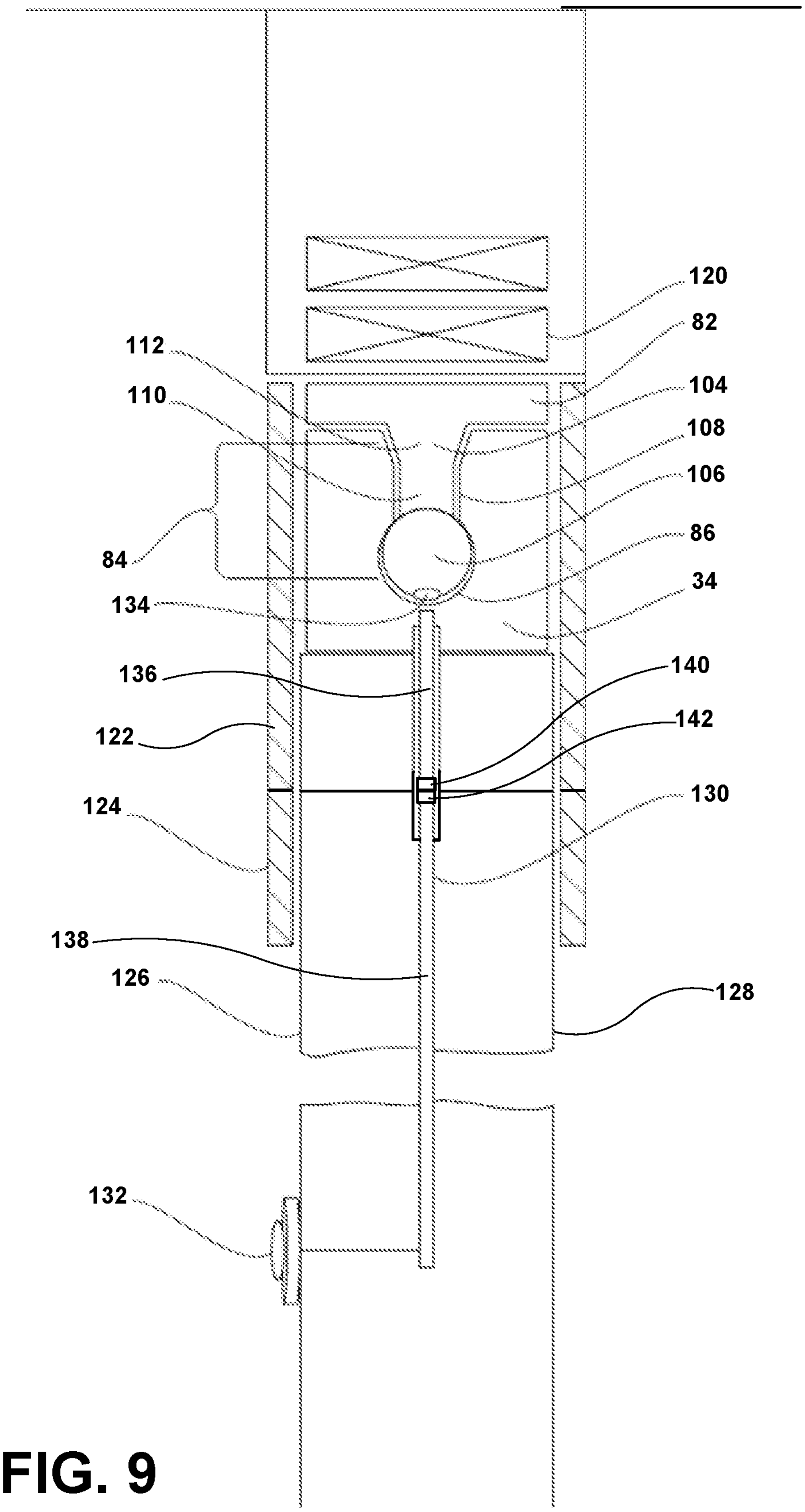
FIG. 9 is a schematic end view showing the cooperation between different components of the sliding door system of FIG. 1.

Referring now to FIGS. 8 and 9, the horizontally elongated rail (32) includes a mounting portion (82) for mounting the rail (32) to the header (28) or other support structure, as further described below. The mounting portion (82) also includes an elongated track (84), which engages the at least one sliding element (34). The at least one sliding element (34), which is mounted to the top surface of the door assembly (36), includes at least one channel (86) for accommodating a part of the elongated track (84), as described in further detail below.

Figure 10A:
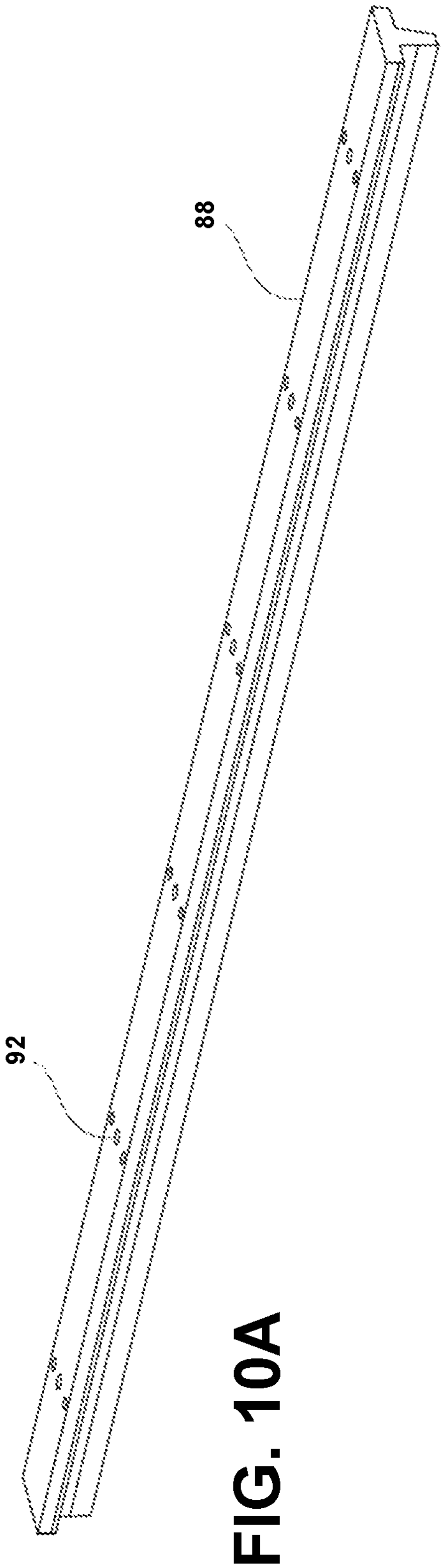
FIGS. 10A and 10B are perspective views of parts making up the elongated rail feature of FIG. 8.
Figure 10B:
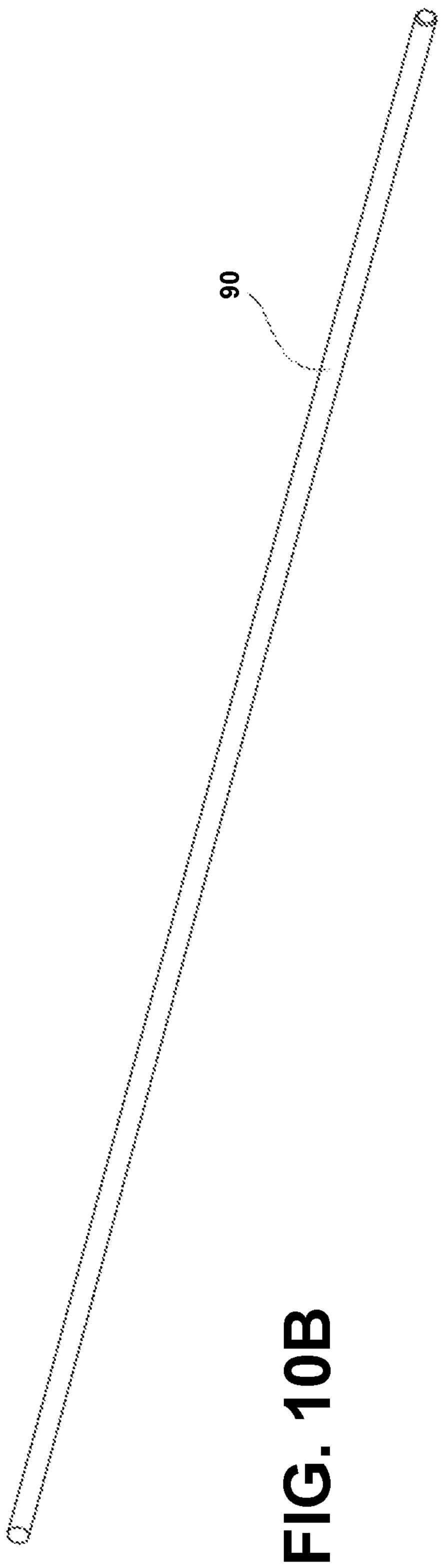

As shown in FIGS. 10A and 10B, the elongated rail (32) may be fashioned from a support (88), and a shaft (90) with tapped holes for subsequent securing the shaft (90) to the support (88). In this case, and as shown most clearly in FIG. 9, the top of the support (88) forms the mounting portion (82), while the bottom of the support (88) and the shaft (90) together form the track (84) mentioned above. It should be noted, however, that alternative ways of producing the elongated rail (32) may be employed, such as by manufacturing the rail (32) as a single, integrally formed piece.

The mounting portion (82) comprises a flat, metal sheet (i.e., lying in a horizontal plane) with a plurality of through holes (92) therein, through which screws are screwed in order to mount the rail (32) to a support structure, such as header (28). If desired, tamper resistant fasteners can be used. As will be apparent to those skilled in the art, a mounting system other than the illustrated hole and screw arrangement can be used. Additionally, the mounting portion (82) need not necessarily comprise a long, unitary piece extending the entire length of the door, but rather, may comprises a sequence of smaller, discrete mounting pieces. It should also be noted that, in some applications, the mounting portion (82) can be configured differently than as is shown if, for example, it was desired for the track to be mounted from a ceiling or off a wall, instead of being mounted within a frame, as is further described below. Any way of securing the elongated rail (32) such that the track (84) extends downwardly may be employed.

Figure 11A:
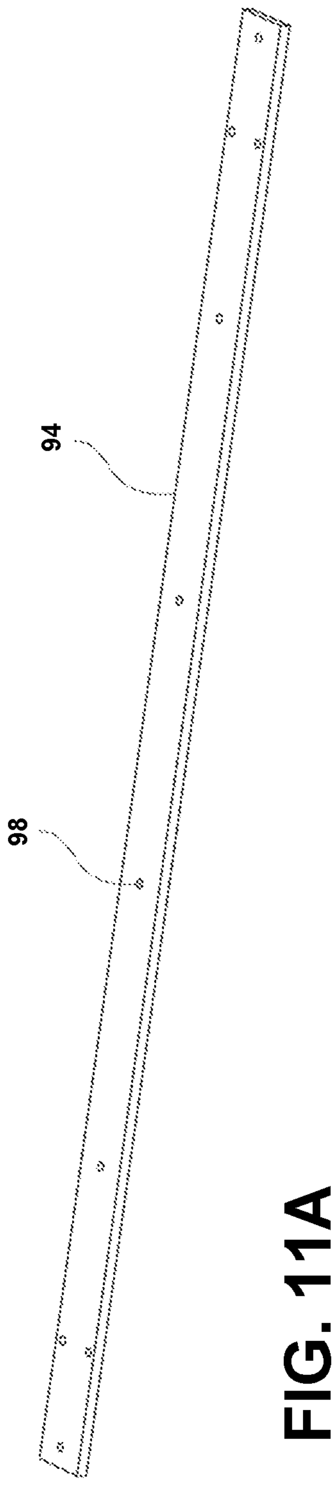
FIGS. 11A and 11B are perspective views of parts making up the sliding element feature of FIG. 8.
Figure 11B:
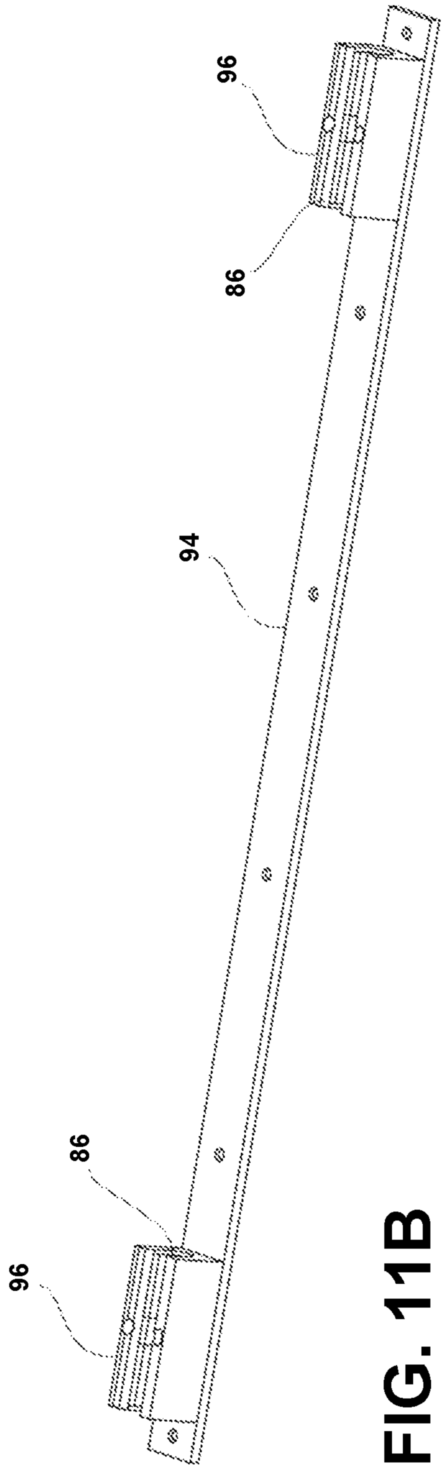

As shown in FIGS. 11A and 11B, the at least one sliding element (34) may be fashioned from the flat metal plate (94) with one or more sliding members (96) affixed thereto. The plate (94) has a plurality of through holes (98) therein, through which screws are screwed in order to mount the at least one sliding element (34) to the door assembly (36). Again, tamper resistant fasteners can be used if desired, and, as will be apparent to those skilled in the art, a mounting system other than the shown hole and screw arrangement can be used. It should be noted, however, that other configurations of the at least one sliding element (34) may be employed.

It should also be noted that the one or more sliding members (96) need not be mounted to the top surface of the door assembly (36) via the flat metal plate (94) as described above, but can also be mounted directly to the top surface of the door assembly (36). For example, a single sliding member (96) may be directly mounted to the top surface of the door assembly (36) and extend along the entire length thereof, or a plurality of sliding members (96) may be mounted to the top surface of the door assembly (36) at both ends thereof, and possibly at other points along its length.

Figure 12A:
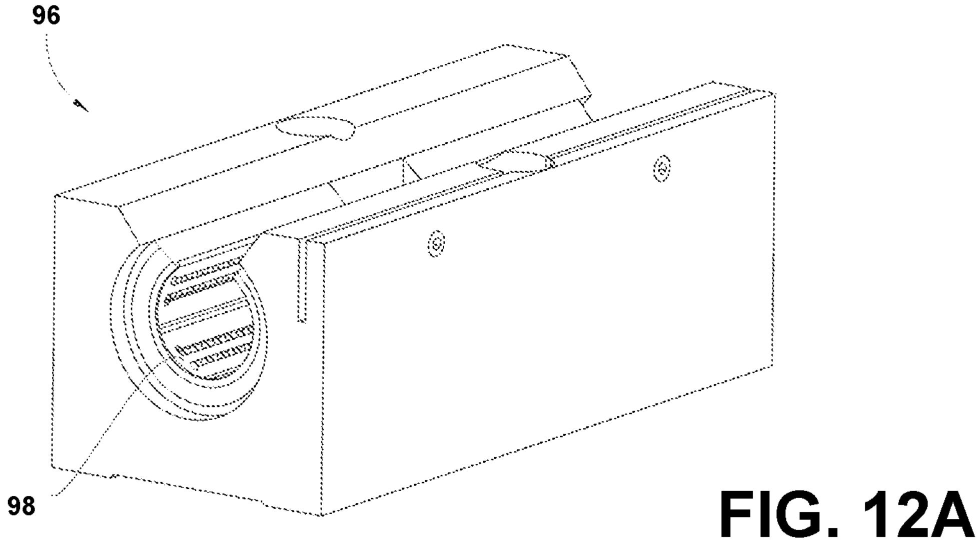
FIGS. 12A and 12B are, respectively, a perspective side view and a perspective top view of a portion of the sliding element feature of FIGS. 11A and 11B.
Figure 12B:
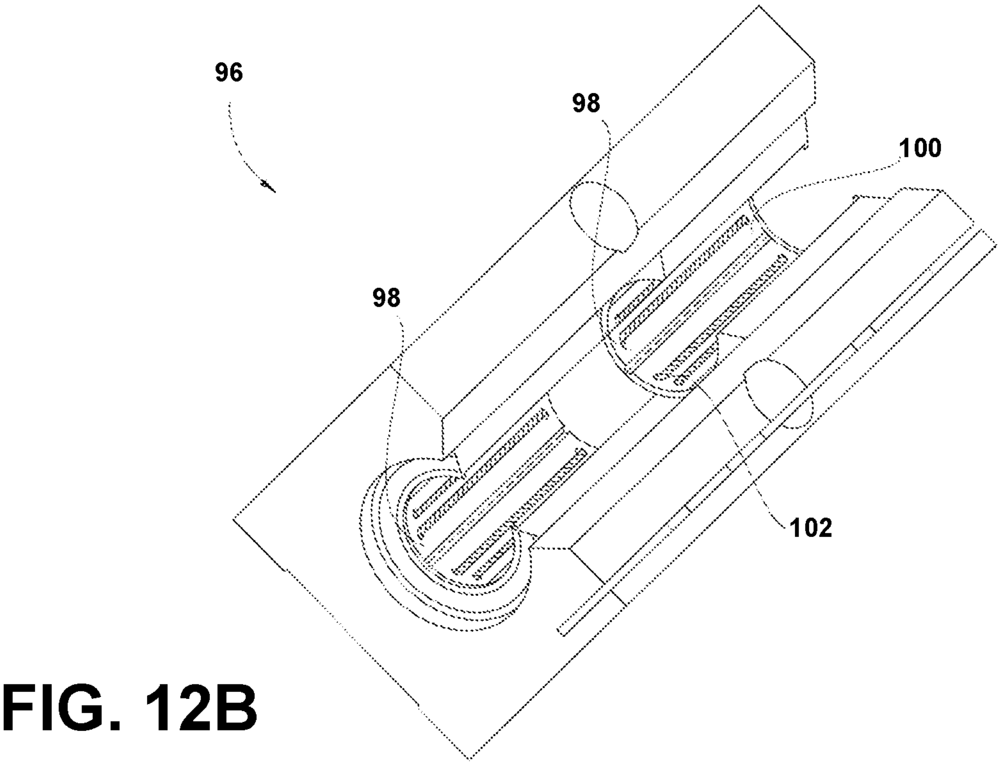

As shown in FIGS. 12A and 12B, in certain advantageous embodiments, each sliding member (96) includes one or more ball bearing slides (98). In the example illustrated, for each slide (98), the wall (100) of the channel (86) contains four races (102), each containing a plurality of ball bearings therein.

Returning to FIG. 9, the elongated rail (32) includes the mounting portion (82) and the track (84) extending downwardly from the mounting portion (82). The track (84) includes a horizontally elongated upper portion (104) and a horizontally elongated protuberance (106) below the upper portion (104). The protuberance (106) has a width that is wider than the width of the upper portion (104) such that, when the track (84) is disposed in the channel (86), the protuberance (106) retains the sliding member (96), such that the sliding member (96) hangs therefrom.

In the illustrated embodiment, the track (84) is a rounded bulge extending down from the mounting portion (82), and the channel (86) has a bulbous profile corresponding to the bulge. The channel (86) includes a horizontally elongated opening (108) along the top thereof for accommodating the horizontally elongated upper portion (104) of the track (84), such that the track (84) is freely slidable along the channel (86).

In certain advantageous embodiments, the upper track portion (104) is designed to further improve the performance of, and decrease the stress on, the sliding system. The upper track portion (104) includes a first portion (110) that extends up from the protuberance (106). This narrower section is defined by vertical inner walls of the at least one sliding element (34). A second portion (112) is located above the first portion (110) and widens as it extends upwardly. This wider, tapered portion is defined by chamfered inner walls above the vertical inner walls of the at least one sliding element (34). The protuberance (106) has a diameter that is greater than the width of the first portion (110), and that may also be greater than the width of the second portion (112).

As a result of this design, the horizontally elongated opening (108) along the top of the channel (86) provides a partially tapered upper track portion (104). First, this provides greater structural integrity than would otherwise exist with a single, ninety-degree bend in the upper track portion (104), which could provide an undesirable fracture point. Additionally, if the door is tilted slightly forward or backward, this tapered shape of the upper track portion (104) reduces the chance of excessive localized friction at a single point on the track.

Figure 13:
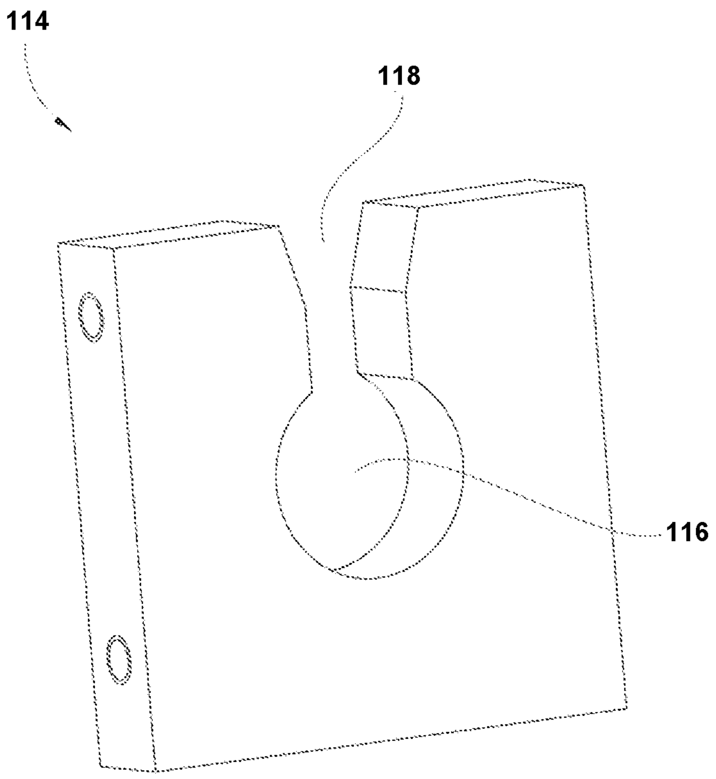
FIG. 13 is a perspective view of an end cap for use with the elongated rail and sliding element features of FIG. 8.

Referring to FIG. 13, an end cap (114) is placed at the left and right ends of the door to stop and cushion the door assembly (36) when it is slid against the left and right studs (24, 26). To facilitate this, the end cap (114) includes a channel (116) corresponding to the channel (86), and an opening (118) on the top thereof corresponding the opening (108). The end cap (114) may be fashioned from high density rubber, which mitigates damage and noise from slamming the door. In combination with the sliding member (96), the end cap (114) ensures operation of the door with minimal noise.

Various reinforcing means, such as metal reinforcing plates, can be provided, both to provide structural support for the assembly and to inhibit tampering. For example, referring again to FIG. 9, one or more reinforcing members (120) may be provided, to which the mounting section (82) is secured.

As also shown in FIG. 9, as well as in FIGS. 1-3, an elongated, flat metal plate (122) may be provided on one or both sides of the upper door section (38). The metal plate (122) extends the entire width of the door assembly (36) and has a top edge that is flush with the top edge of door assembly (36). As a result, the plate (122) not only further supports the mounting of at least one sliding element (34) to the top surface of the door assembly (36), but it also covers the entire at least one sliding element (34), such that, in embodiments employing discrete sliding members (96) along the top surface of the door assembly (36), use of these as ligature points is inhibited. Similarly, an elongated, flat metal plate (124) may be provided on one or both sides of the lower door section (40).

As a result of this above-described track and slide assembly, the at least one sliding element (34) is retained by the track (84) such that it hangs therefrom, and it is slidable thereon with the aid of the sliding elements (96). With this configuration, there are no wheels that may be knocked off, or out of, a rail or the like. In fact, there is essentially no way at all for the door to be unintentionally removed from the track, as removal therefrom would require the intentional disassembly of several components. Additionally, there are no components in this configuration that can serve as a ligature point in those environments where this is a concern.

Referring again to FIG. 9, between a front wall (126) of the door assembly (36) and a back wall (128) of the door assembly (36) is a vertically oriented rod (130). The rod (130), which is concealed from view and cannot be directly accessed from either side of the door assembly (36), can be moved up and down to lock and unlock the door assembly (36) using an actuator (132). When the actuator (132) moves the rod (130) from the unlocked position to the locked position, the rod (130) is moved upwardly such that the top end of the rod (130) is advanced into an aperture (134) of the protuberance (106) of the elongated rail (32). When the rod (130) is moved from the locked position to the unlocked position, the rod (130) is moved downwardly, such that the top end of the rod (130) is withdrawn from the aperture (134) of the protuberance (106).

As a result of this locking mechanism, there is no need for a traditional latch or bolt extending out from the edge of the door, which could be used as a ligature point. Since users of the door have no access to the rod (130) itself, the door is able to be locked and unlocked without presenting any ligature risks.

In order to accommodate emergency pivoting of the lower door section (40) with respect to the upper door section (38) when desired (e.g., when sliding is prevented due to a barricade situation), the rod (130) is divided into an upper rod portion (136) disposed within the upper door section (38) and a lower rod portion (138) disposed within the lower door section (40). The top end of the rod (130), which fits into the protuberance (106) of the elongated rail (32), is defined by the upper rod portion (136), while the actuator (132) cooperates with the lower rod portion (138). The upper rod portion (136) and the lower rod portion (138) are engageable when the lower door section (40) is in the closed position so as to move together, such that actuation of the actuator (132) is translated into movement of the top end of the rod (130) by way of simultaneous movement of the upper rod portion (136) and the lower rod portion (138). However, the upper rod portion (136) and the lower rod portion (138) are disengageable so as to allow for the lower door section (40) to be pivoted to the open position when the safety release (48) is moved to the disengaged position.

In the illustrated embodiment, this engageability and disengageability between the upper rod portion (136) and the lower rod portion (138) is achieved by the provision of cooperating magnets, one magnet (140) being attached to a lower end of the upper rod portion (136) and the other magnet (142) being attached to the upper end of the lower rod portion (138). Of course, other arrangement are possible for achieving the same function, such as the provision of only one magnet, or other mechanisms entirely for disengageable attachment between the two rod sections.

Figure 14A:
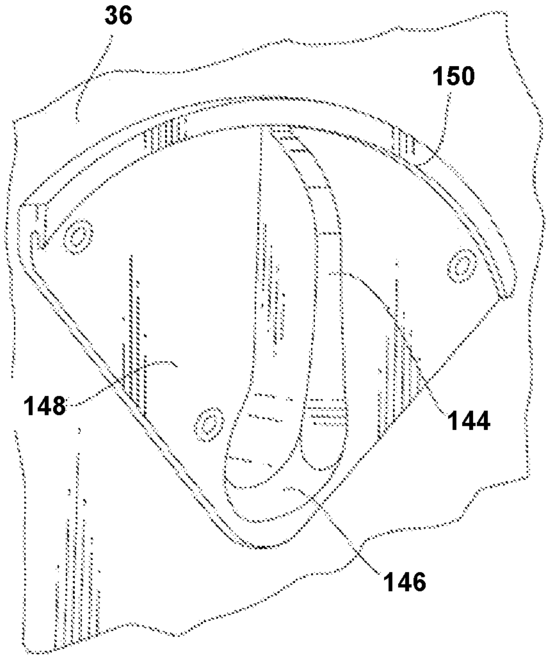
FIG. 14A is a perspective view of an anti-ligature thumb turn that may be employed as the actuator to lock the door in a closed position.

The actuator (132) may comprise anti-ligature hardware, such as, for example, the hardware disclosed in commonly owned U.S. Pat. No. 8,584,494, titled "Anti-Ligature Door Hardware", the specification of which is hereby incorporated by reference herein in its entirety. For example, as shown in FIG. 14A, the actuator may comprise an anti-ligature thumb turn (144). The thumb turn (144) may have a pivot point (146) at one end, which is in pivotal connection with a plate (148). The thumb turn (144) and plate (148) may be substantially close to one another to inhibit a ligature from being inserted therebetween. Further, the plate (148) may be affixed substantially close to the door assembly (36) to inhibit a ligature from being inserted therebetween.

On the end of the thumb turn (144) opposite from the pivot point (146), although not limited thereto, there may be a retaining member on the plate (148), such as a railing (150). The railing (150) may be adjacent to the thumb turn (144) in order to retain it in place. If the railing (150) is substantially close with the thumb turn (144), it may inhibit someone from inserting a ligature therebetween. In one embodiment, the railing (150) may partially overlap the thumb turn (144) to further retain it in place and inhibit it from being dislodged.

Figure 14B:
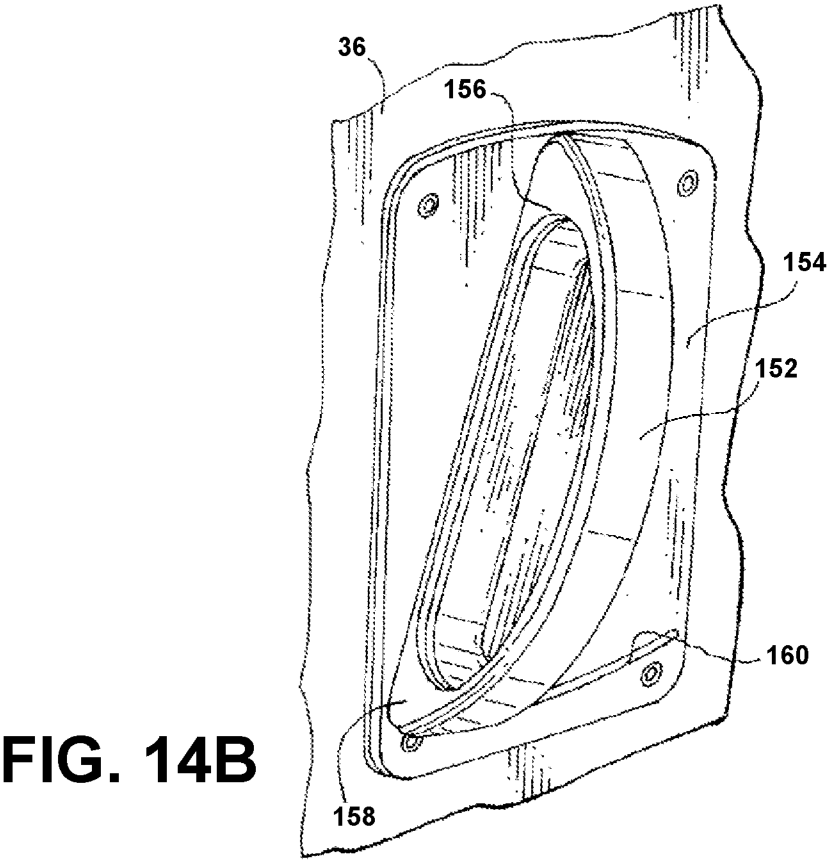
FIG. 14B is a perspective views of an anti-ligature lever that may be employed as the actuator to lock the door in a closed position.

As another example, as shown in FIG. 14B, the actuator may comprise an anti-ligature door handle (152) have a crescent or elongated shape, although not limited thereto. In this way, it may be tapered (e.g., crescent shaped, etc.) to inhibit a person from hanging a ligature or some other material on the door handle (152) in order to hang him- or herself. The elongated member of the door handle (152) is preferably constructed without an opening. This way, a ligature cannot be passed through the door handle (152) for affixing thereto. However, it may have an indented portion to enable a user to easily pull a door open. The door handle (152) and a cooperating plate (154) may be fastened substantially close with the door assembly (36) such that there is only a minute space therebetween. This inhibits a person from slipping a ligature between the door handle (152) and the door assembly (36).

The door handle (152) may be in pivotal connection with the plate (154) member, although not limited thereto. The plate member (154) and the door handle (152) may be substantially close to one another to inhibit a ligature from being inserted therebetween. The door handle (152) may have a pivot point (156) so that pivoting the door handle (152) about one end may operate the rod (130). It is appreciated that the pivot point (156) could be anywhere on the door handle (152) and it is not limited to its end. However, positioning the pivot point (156) substantially near its end helps secure the door handle (152) and may inhibit a person from slipping a ligature between the door handle (152) and the plate (154) at that end.

The door handle (152) may also have a toe (158) which interacts with a retaining member on the plate (154) such as a toe track (160), although not limited thereto. The toe (158) may be situated on the end of door handle (152) opposite from the pivot point (156), although not limited thereto. This allows for pivoting of the door handle (152) at the pivot point (156), while at the same time helping retain the door handle (152). The toe track (160) may retain the toe (158) of the door handle (152) by inhibiting it from being pivoted farther than the toe track (160) permits.

Since the door handle (152) may be coupled with the plate (154) substantially near each of its ends (e.g., pivot point and toe), a person attempting suicide is unable to slip a ligature between the door handle (152) and the plate (154) in order to hang him- or herself. The two connections also make it difficult for a person to break the door handle (152) off of the plate (154) and away from the door assembly (36), either to use it as a weapon, to cause damage to the door, or for some other reason.

As previously noted with reference to FIG. 1, the inventive sliding door system (20) can be surface mounted against a wall having a standard door opening provided therein. The door assembly (36) is generally sized to be slightly larger than the opening, and the frame (22) is positioned such that, in the closed position, the door assembly (36) covers the opening, and a portion of the wall will be visible through the frame. When the door is slid to the open position, the opening is exposed, and the previously visible portion of the wall is now covered by the door. The system (20) can be surface mounted against the wall in this way and the design provides only a very small space (1/16") between the door and the wall when the door is slid open. As a result, there is essentially no room for contraband to be hidden between the door assembly (36) and the wall.

In other embodiments, however, a frame structure like frame (22) is not required, and the track and channel structure may be mounted to a ceiling, wall, or the like, depending on the desired application. Moreover, though an institutional type of sliding door has been described, which includes aesthetically simple hardware, it should be understood that a more elaborate and/or aesthetically pleasing door and/or door hardware may be employed.

As previously described, the inventive system provides a sliding door, and more particularly a sliding door that possesses an emergency swing feature, such that in the event that the sliding door is barricaded from inside a room (e.g., by wedging paper or other items between the door and the door frame, by affixing an element to an inner surface of the door such that the element contacts the frame, thereby preventing sliding, etc.), the door may be swung outwardly by authorized personnel in order to access the barricaded room.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A sliding door system, comprising, a horizontally elongated rail adapted to be mounted with respect to a door opening;

a door assembly slideably mounted on said rail and adapted to be slideable along a generally vertical imaginary plane, said door assembly comprising:

an upper door section comprising at least one sliding element disposed along a top surface thereof, said sliding element cooperating with said rail to provide for the slideable mounting of said door assembly on said rail;

a lower door section pivotably attached to said upper door section at an attached end thereof so as to be pivotable with respect to said upper door section about a generally vertical axis from a closed position, in which said upper door section and said lower door section are generally co-planar, to an open position, said lower door section having a free end opposite the attached end; and a safety release having an engaged position, in which said lower door section and said upper door section are fixed in the closed position, and having a disengaged position, in which said lower door section is pivotable to the open position:

wherein said safety release comprises a member pivotably attached to said upper door section, and wherein said member is pivotable between the engaged position, in which the member interacts with said lower door section such that said lower door section is fixed with respect to said upper door section, and the disengaged position, in which said member no longer interacts with said lower door section such that said lower door section is pivotable to the open position; and wherein the member is pivotably attached to the upper door section by way of a fastener such that the member is moveable between the engaged position and the disengaged position when the fastener is loosened, and is fixed in position when the fastener is tightened.

2. The sliding door system of claim 1 wherein said door assembly has a private side and a public side, and wherein said safety release is accessible only from the public side.

3. The sliding door system of claim 2 wherein the free end of said lower door section is pivotable with respect to said upper door section in a direction toward the public side upon disengagement of said safety release.

4. The sliding door system of claim 1, wherein said door assembly includes a front wall and a back wall opposite the front wall, and wherein said rail includes an aperture, the system further comprising:

a vertically extending rod positioned between the front wall and the back wall of said door assembly, said rod having a top end;

an actuator located on at least one of the front wall and the back wall of said door assembly that moves said rod between an unlocked position and a locked position, wherein, when said actuator moves said rod from the unlocked position to the locked position, said actuator moves said rod upwardly such that the top end of said rod is advanced into the aperture of said rail, and when said actuator moves said rod from the locked position to the unlocked position, said actuator moves said rod downwardly such that the top end of said rod is withdrawn from the aperture of said rail.

5. The sliding door system of claim 1, wherein:

a lower edge of said upper door section comprises a generally horizontally disposed protrusion or channel;

an upper edge of said lower door section comprises a generally horizontally disposed protrusion or channel; and wherein the protrusion or channel of said upper door section cooperates with the protrusion or channel of said lower door section when said lower door section is in the closed position, whereby sagging of said lower door section with respect to said upper door section is reduced.

6. The sliding door system of claim 5, wherein said door assembly has a private side and a public side, wherein said safety release is accessible only from the public side, and wherein the protrusion or channel of said upper door section and the protrusion or channel of said lower door section are configured to as to prevent the free end of said lower door section from being pivotable with respect to said upper door section from the closed position in a direction toward the private side.

7. The sliding door system of claim 1:

further comprising a threshold adapted to be mounted with respect to a floor of the door opening, said threshold having a groove formed therein; and wherein said lower door section comprises a generally vertically disposed lip extending from a lower edge thereof, said lip being disposed within the groove formed in said threshold, so as to allow for relative sliding between said door assembly and said threshold, but so as to prevent swinging of said door assembly out of alignment with said threshold.

8. The sliding door system of claim 7 wherein said lip is retractable out of the groove formed in said threshold, so as to allow for said lower door section to be pivoted to the open position when said safety release is in the disengaged position.

9. The sliding door system of claim 8 wherein said lip is defined by a plate pivotably attached to said lower door section, and wherein said lip is retractable out of the groove by virtue of said plate defining said lip being pivoted from an extended position, in which said lip is disposed within the groove formed in said threshold, to a retracted position, in which said lip is retracted out of the groove formed in said threshold.

10. A sliding door system, comprising, a horizontally elongated rail adapted to be mounted with respect to a door opening;

a door assembly slideably mounted on said rail and adapted to be slideable along a generally vertical imaginary plane, said door assembly comprising:

an upper door section comprising at least one sliding element disposed along a top surface thereof, said sliding element cooperating with said rail to provide for the slideable mounting of said door assembly on said rail;

a lower door section pivotably attached to said upper door section at an attached end thereof so as to be pivotable with respect to said upper door section about a generally vertical axis from a closed position, in which said upper door section and said lower door section are generally co-planar, to an open position, said lower door section having a free end opposite the attached end; and a safety release having an engaged position, in which said lower door section and said upper door section are fixed in the closed position, and having a disengaged position, in which said lower door section is pivotable to the open position;

wherein said safety release comprises a member pivotably attached to said upper door section, and wherein said member is pivotable between the engaged position, in which the member interacts with said lower door section such that said lower door section is fixed with respect to said upper door section, and the disengaged position, in which said member no longer interacts with said lower door section such that said lower door section is pivotable to the open position; and wherein the member is pivotably attached to the upper door section and wherein the member is affixable to the lower door section by way of a fastener when the member is pivoted to the engaged position, such that the member is moveable between the engaged position and the disengaged position when the fastener is loosened, and is fixed in position when the member is pivoted to the engaged position and the fastener is tightened.

11. A sliding door system, comprising, a horizontally elongated rail adapted to be mounted with respect to a door opening;

a door assembly slideably mounted on said rail and adapted to be slideable along a generally vertical imaginary plane, said door assembly comprising:

an upper door section comprising at least one sliding element disposed along a top surface thereof, said sliding element cooperating with said rail to provide for the slideable mounting of said door assembly on said rail;

a lower door section pivotably attached to said upper door section at an attached end thereof so as to be pivotable with respect to said upper door section about a generally vertical axis from a closed position, in which said upper door section and said lower door section are generally co-planar, to an open position, said lower door section having a free end opposite the attached end; and a safety release having an engaged position, in which said lower door section and said upper door section are fixed in the closed position, and having a disengaged position, in which said lower door section is pivotable to the open position;

wherein said door assembly includes a front wall and a back wall opposite the front wall, and wherein said rail includes an aperture, the system further comprising:

a vertically extending rod positioned between the front wall and the back wall of said door assembly, said rod having a top end; and an actuator located on at least one of the front wall and the back wall of said door assembly that moves said rod between an unlocked position and a locked position, wherein, when said actuator moves said rod from the unlocked position to the locked position, said actuator moves said rod upwardly such that the top end of said rod is advanced into the aperture of said rail, and when said actuator moves said rod from the locked position to the unlocked position, said actuator moves said rod downwardly such that the top end of said rod is withdrawn from the aperture of said rail; and wherein said rod comprises:

an upper rod portion disposed within said upper door section, wherein the top end of said rod is defined by said upper rod portion, and a lower rod portion disposed within said lower door section, wherein said actuator cooperates with said lower rod portion;

wherein said upper rod portion and said lower rod portion are engageable when said lower door section is in the closed position so as to move together, whereby actuation of the actuator is translated into movement of the top end of said rod by way of simultaneous movement of said upper rod portion and said lower rod portion; and wherein said upper rod portion and said lower rod portion are disengageable so as to allow for said lower door section to be pivoted to the open position when said safety release is moved to the disengaged position.

12. The sliding door system of claim 11, wherein said upper rod portion and said lower rod portion are engageable and disengageable by way of cooperating magnets.

13. The sliding door system of claim 11, wherein the actuator comprises a thumb-turn lock or a lever handle.

14. A sliding door system, comprising, a horizontally elongated rail adapted to be mounted with respect to a door opening;

a door assembly slideably mounted on said rail and adapted to be slideable along a generally vertical imaginary plane, said door assembly comprising:

an upper door section comprising at least one sliding element disposed along a top surface thereof, said sliding element cooperating with said rail to provide for the slideable mounting of said door assembly on said rail;

a lower door section pivotably attached to said upper door section at an attached end thereof so as to be pivotable with respect to said upper door section about a generally vertical axis from a closed position, in which said upper door section and said lower door section are generally co-planar, to an open position, said lower door section having a free end opposite the attached end; and a safety release having an engaged position, in which said lower door section and said upper door section are fixed in the closed position, and having a disengaged position, in which said lower door section is pivotable to the open position;

wherein said horizontally elongated rail comprises a mounting portion with which the rail is adapted to mounted to a support structure and a horizontally elongated track extending downwardly from the mounting portion, said horizontally elongated track comprising a horizontally elongated upper portion having a width, and a horizontally elongated protuberance below the upper portion having a width greater than the width of the upper portion; and wherein said at least one sliding element includes a channel corresponding to the horizontally elongated protuberance of said rail and in which part of the elongated protuberance is disposed such that the sliding element is retained by and slidable on the elongated protuberance.

15. The sliding door system of claim 14, wherein the channel has a horizontally elongated opening along a top edge thereof that accommodates the horizontally elongated upper portion of the track as said at least one sliding element slides on the protuberance.

16. The sliding door system of claim 15, wherein the protuberance comprises a bulge, and the channel has a bulbous profile corresponding to the bulge.

17. A sliding door system, comprising, a horizontally elongated rail adapted to be mounted with respect to a door opening;

a door assembly having a private side and a public side, said door assembly slideably mounted on said rail and adapted to be slideable along a generally vertical imaginary plane, said door assembly comprising:

an upper door section comprising at least one sliding element disposed along a top surface thereof, said sliding element cooperating with said rail to provide for the slideable mounting of said door assembly on said rail;

a lower door section pivotably attached to said upper door section at an attached end thereof so as to be pivotable with respect to said upper door section about a generally vertical axis from a closed position, in which said upper door section and said lower door section are generally co-planar, to an open position, said lower door section having a free end opposite the attached end, the free end being pivotable with respect to said upper door section in a direction toward the public side to the open position; and a safety release having an engaged position, in which said lower door section and said upper door section are fixed in the closed position, and having a disengaged position, in which said lower door section is pivotable to the open position, said safety release being accessible only from the public side of said door assembly and comprising a member pivotably attached to said upper door section, and wherein said member is pivotable between the engaged position, in which the member interacts said lower door section such that said lower door section is fixed with respect to said upper door section, and the disengaged position, in which said member no longer interacts said lower door section such that said lower door section is pivotable to the open position; and wherein the member is pivotably attached within the upper door section by way of a rotatable cylinder.

18. The sliding door system of claim 17 wherein the rotatable cylinder is operable by a tool or a key.

19. The sliding door system of claim 17, wherein said door assembly includes a front wall and a back wall opposite the front wall, and wherein said rail includes an aperture, the system further comprising:

a vertically extending rod positioned between the front wall and the back wall of said door assembly, said rod having a top end;

an actuator located on at least one of the front wall and the back wall of said door assembly that moves said rod between an unlocked position and a locked position, wherein, when said actuator moves said rod from the unlocked position to the locked position, said actuator moves said rod upwardly such that the top end of said rod is advanced into the aperture of said rail, and when said actuator moves said rod from the locked position to the unlocked position, said actuator moves said rod downwardly such that the top end of said rod is withdrawn from the aperture of said rail.

20. The sliding door system of claim 19, wherein said rod comprises:

an upper rod portion disposed within said upper door section, wherein the top end of said rod is defined by said upper rod portion, and a lower rod portion disposed within said lower door section, wherein said actuator cooperates with said lower rod portion;

wherein said upper rod portion and said lower rod portion are engageable when said lower door section is in the closed position so as to move together, whereby actuation of the actuator is translated into movement of the top end of said rod by way of simultaneous movement of said upper rod portion and said lower rod portion; and wherein said upper rod portion and said lower rod portion are disengageable so as to allow for said lower door section to be pivoted to the open position when said safety release is moved to the disengaged position.

21. The sliding door system of claim 20, wherein said upper rod portion and said lower rod portion are engageable and disengageable by way of cooperating magnets.

22. The sliding door system of claim 17, wherein:

a lower edge of said upper door section comprises a generally horizontally disposed protrusion or channel;

an upper edge of said lower door section comprises a generally horizontally disposed protrusion or channel; and wherein the protrusion or channel of said upper door section cooperates with the protrusion or channel of said lower door section when said lower door section is in the closed position, whereby sagging of said lower door section with respect to said upper door section is reduced.

23. The sliding door system of claim 22, wherein said safety release is accessible only from the public side of said door assembly, and wherein the protrusion or channel of said upper door section and the protrusion or channel of said lower door section are configured to as to prevent the free end of said lower door section from being pivotable with respect to said upper door section from the closed position in a direction toward the private side.

24. The sliding door system of claim 17:

further comprising a threshold adapted to be mounted with respect to a floor of the door opening, said threshold having a groove formed therein; and wherein said lower door section comprises a generally vertically disposed lip extending from a lower edge thereof, said lip being disposed within the groove formed in said threshold, so as to allow for relative sliding between said door assembly and said threshold, but so as to prevent swinging of said door assembly out of alignment with said threshold.

25. The sliding door system of claim 24 wherein said lip is retractable out of the groove formed in said threshold, so as to allow for said lower door section to be pivoted to the open position when said safety release is in the disengaged position.

26. The sliding door system of claim 25 wherein said lip is defined by a plate pivotably attached to said lower door section, and wherein said lip is retractable out of the groove by virtue of said plate defining said lip being pivoted from an extended position, in which said lip is disposed within the groove formed in said threshold, to a retracted position, in which said lip is retracted out of the groove formed in said threshold.

* * * * *